(12) United States Patent
Washizawa

(10) Patent No.: US 6,198,847 B1
(45) Date of Patent: *Mar. 6, 2001

(54) APPARATUS AND METHOD FOR RECOGNIZING A NONUNIFORMLY SAMPLED PATTERN

(75) Inventor: Teruyoshi Washizawa, Atsugi (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/938,789

(22) Filed: Sep. 26, 1997

(30) Foreign Application Priority Data

Sep. 30, 1996 (JP) .................................................. 8-258743

(51) Int. Cl.[7] .............................. G06K 9/00; G06K 9/62
(52) U.S. Cl. ........................................... 382/228; 382/181
(58) Field of Search ................................. 382/182, 181, 382/184, 255, 153, 148, 190, 246, 189, 224–225, 228–229, 209, 298–299, 216; 358/457

(56) References Cited

U.S. PATENT DOCUMENTS

| | | | |
|---|---|---|---|
| 5,555,102 | * | 9/1996 | Dalton ............................... 358/456 |
| 5,649,021 | * | 7/1997 | Matey et al. ...................... 382/128 |
| 5,835,641 | * | 11/1998 | Sotoda et al. ..................... 382/291 |

OTHER PUBLICATIONS

"Centering Peripheral Features In an Indoor Environment Using a Binocular Log–Polar 4 DOF Camera Head", R.A. Peters, et al., from International Workshop on Biorobotics: Human–Robot Symbiosis, Tsukuba, Japan, May 1995, vol. 18, No. 1–2, published in, *Robotics and Autonomous Systems 18*, Jul. 1996, Elsevier, Netherlands, pp. 271–281.

"Active Object Recognition Integrating Attention and Viewpoint Control", S.J. Dickson, et al., Computer Vision—ECCV '94. Third European Conference on Computer Vision, vol. II, pp. 3–14, 1994, Berlin, Germany.

* cited by examiner

*Primary Examiner*—Bhavesh Mehta
(74) *Attorney, Agent, or Firm*—Fitzpatrick, Cella, Harper & Scinto

(57) ABSTRACT

In a pattern recognition apparatus, light from an original on which a pattern to be recognized is depicted is focused by an optical system. The focused image is sampled by a two-dimensional array sensor. The pattern depicted on the original is recognized based on a multiresolution partial image obtained by the sampling. A moving device moves the optical axis of the optical system relative to the original in response to a control signal based on the result of the recognition.

21 Claims, 41 Drawing Sheets

FIG.20

| 2 | 3 | 4 | 5 | 6 | 7 | 8 |
|---|---|---|---|---|---|---|
| 0 1 0 / 0 1 1 / 0 0 0 | 0 1 0 / 1 1 0 / 0 0 0 | 1 0 1 / 0 1 0 / 0 0 0 | 1 0 0 / 1 1 0 / 0 0 0 | 0 0 0 / 1 1 0 / 1 0 0 | 0 0 0 / 0 1 0 / 1 0 1 | 0 0 0 / 0 1 1 / 0 0 1 |

| 9 | 10 | 11 | 12 | 13 | 14 | 15 |
|---|---|---|---|---|---|---|
| 0 0 0 / 0 0 0 / 0 0 0 | 8 9 6 / 9 4 9 / 2 9 3 | 8 9 6 / 9 4 9 / 2 9 5 | 8 9 6 / 9 3 9 / 2 9 3 | 9 9 9 / 9 9 9 / 9 9 9 | 13 13 13 / 13 10 13 / 13 13 11 | 13 13 13 / 13 10 13 / 13 13 12 |

FIG.21
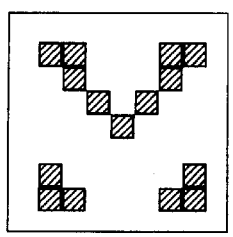 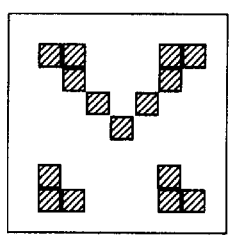 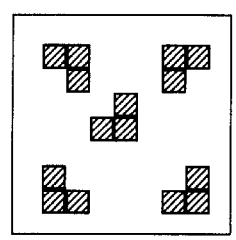 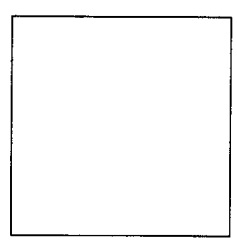
10　　　　　　11　　　　　　12　　　　　　13

FIG. 28

Saccade6.m

% includes spatial hierarchical structure.

function [seq_gaze,seq_ycl,seq_yc2]=saccade6(itr,init_gaze,crt)

```
VQMAT0=[ -1 -1 -1 -1 +1 +1 -1 -1 -1 +1 -1                           %9
         -1 +1 -1 -1 -1 -1 -1 -1 -1 -1 -1                           %10
         -1 +1 -1 -1 +1 -1 -1 -1 -1 -1 -1                           %14
         +1 +1 +1 -1 -1 -1 +1 +1 -1 -1 -1                           %15
         +1 +1 +1 -1 +1 -1 -1 -1 -1 +1 -1                           %16
         -1 -1 -1 +1 -1 -1 -1 -1 -1 +1 -1                           %17
         -1 -1 -1 -1 -1 -1 -1 -1 -1 +1 -1                           %18
         -1 -1 -1 -1 -1 -1 -1 -1 -1 -1 -1 ];                        %19

NUM00=8;
[M,N]=size(VQMAT0);
VQMAT0=(VQMAT0./(ones(M,1) * sprt(sum(VQMAT0.^2))));

%1                  %2                  %3
VQMATC1=[0 0 0 0 0 0 0 0 1 0 1 0 1 0 1 0 1 0 0 1 0 1 0 1 0 1 0 1 0 1 0 0 1 0 1
         0 0 0 0 0 0 0 0 0 1 0 0 0 0 0 0 0 0 1 0 0 0 0 0 0 0 0 0 0 0 0 1 0 0 0
         0 0 0 0 0 0 0 0 0 0 0 0 0 0 0 0 0 0 0 0 0 0 0 1 0 0 0 0 1 0 0 0 0 0 0
         0 0 0 0 0 0 1 0 0 0 0 0 0 0 0 0 1 0 0 0 0 0 1 0 0 0 0 0 0 0 0 0 0 0 0
         0 0 0 0 1 0 0 0 0 0 0 0 0 0 0 1 0 0 0 0 0 0 0 0 0 0 0 0 0 0 0 0 0 0 0
         1 0 0 0 0 0 0 0 0 0 0 0 0 0 1 0 0 0 0 0 0 0 0 0 0 0 0 0 0 1 0 0 0 0 0
         0 0 1 0 0 0 0 0 0 0 0 0 0 0 0 0 0 0 0 0 0 0 0 0 0 0 0 0 0 0 0 0 1 0 0
         0 0 0 0 0 0 0 0 0 0 0 0 1 0 0 0 0 0 0 0 0 0 0 0 0 0 0 0 0 0 0 0 0 0 1
```

FIG.29

Saccade6.m

% repleced by 0 0 0 0 0 1 0 0 0;

```
[0 1 0 0 0 0 0 0 0;
 0 0 0 0 0 0 0 0 1;
 0 0 0 0 1 0 0 0 1;
 0 0 0 1 0 0 0 0 1;
 0 0 1 0 0 0 0 0 1;
 0 1 0 0 0 0 0 0 1;
 0 0 0 0 0 0 0 0 1;
 0 0 0 0 0 0 0 0 1;
 0 0 0 0 0 0 0 0 1;
 0 0 0 0 0 0 0 0 1];                                                %5
NUMO1=4;
VQMATC1=mat2vec2(VQMATC1,NUMO0,3*3NUMO1,0),NUMO0*3*3,NUMO1,1);
[M,N]=size(VQMATC1);
%VQMATC1=(VQMATC1./(ones(M,1)*sqrt(sum(VQMATC1.^2))));

VQMATC2=[0 0 0 1 ; 0 0 0 1 ; 0 0 0 1 ;                              %1
         0 0 0 1 ; 1 0 0 0 ; 0 0 0 1 ;
         0 0 0 1 ; 0 0 1 0 ; 0 0 0 1 ;                              %2
         0 0 0 1 ; 0 1 0 0 ; 0 0 0 1 ;
         0 0 0 1 ; 0 0 0 1 ; 0 0 1 0];
NUMO2=2;
VQMATC2=mat2vec2(VQMATC2,NUMO1,3*3*2,0),NUMO1*3*3,2,1);
[M,N]=size(VQMATC2);
%VQMATC2=(VQMATC2./(ones(M,1)*sqrt(sum(VQMATC2))));

VQMATC21=zeros(NUMO0*3*3,2);
for indx=1:2
  for m=1:3*3
    VQMATC21((m-1)*NUMO0+1:m*NUMO0,indx)=...
        VQMATC1((m-1)*NUMO0+1:m*NUMO0,:)*VQMATC2((m-1)*NUMO1+1:m*NUMO1,indx));
  end
end
h=[-1 -1 -1 1 1 1 -1 -1 -1]';
```

FIG. 30

Saccade6.m

```
h=h/sqrt(sum(h.^2));
%hv=h' * VQMAT0;
VQMATS1=h7 * VQMAT0);
fh1=mat2vec2(h,3,3,1);

%VQMATS1=[hv(7) hv(8) hv(1) hv(8) hv(3) hv(8) hv(5) hv(8) hv(2) ;
%         hv(7) hv(8) hv(1) hv(8) hv(3) hv(8) hv(5) hv(8) hv(5) ;
%         hv(7) hv(8) hv(1) hv(8) hv(3) hv(8) hv(5) hv(8) hv(2) ;
%         hv(7) hv(8) hv(1) hv(8) hv(3) hv(8) hv(5) hv(8) hv(5) ];
%VQMATS1=(VQMATS1./(ones(9,1)*sqrt(sum(VQMATS1.^2))));

h2=mat2vec2(imresize(mat2ves2(h,3,3,1),3,'nearest'),9,9,0);
h2=h2/sqrt(sum(h.^2));
fh2=mat2vec2(h2,3,3,1);

hs21=[mat2vec2(VQMAT0(:,7),3,3,1);mat2vec2(VQMAT0(:,8),3,3,1);mat2vec2(VQMAT0(:,1),3,3,1);
hs21=[hs21 [mat2vec2(VQMAT0(:,8),3,3,1];mat2vec2(VQMAT0(:,3),3,3,1);mat2vec2(VQMAT0(:,8),3,3,1]]];
hs21=[hs21 [mat2vec2(VQMAT0(:,5),3,3,1];mat2vec2(VQMAT0(:,8),3,3,1);mat2vec2(VQMAT0(:,2),3,3,1]]];
hs22=[mat2vec2(VQMAT0(:,7),3,3,1);mat2vec2(VQMAT0(:,8),3,3,1);mat2vec2(VQMAT0(:,8),3,3,1);
hs22=[hs22 [mat2vec2(VQMAT0(:,8),3,3,1];mat2vec2(VQMAT0(:,3),3,3,1);mat2vec2(VQMAT0(:,8),3,3,1]]];
hs22=[hs22 [mat2vec2(VQMAT0(:,5),3,3,1];mat2vec2(VQMAT0(:,8),3,3,1);mat2vec2(VQMAT0(:,4),3,3,1]]];
hs23=[mat2vec2(VQMAT0(:,8),3,3,1);mat2vec2(VQMAT0(:,8),3,3,2);mat2vec2(VQMAT0(:,1),3,3,1);
hs23=[hs23 [mat2vec2(VQMAT0(:,8),3,3,1];mat2vec2(VQMAT0(:,2),3,3,1);mat2vec2(VQMAT0(:,8),3,3,1]]];
hs23=[hs23 [mat2vec2(VQMAT0(:,5),3,3,1];mat2vec2(VQMAT0(:,8),3,3,1);mat2vec2(VQMAT0(:,2),3,3,1]]];
hs24=[VQMAT0[:,8) VQMAT0(:,8) VQMAT0(:,8) VQMAT0(:,8) VQMAT0(:,8) VQMAT0(:,8) VQMAT0(:,8)
      VQMAT0(:,8)];

hs2=[mat2vec2(hs21,9,9,0) mat2vec2(hs22,9,9,0) mat2vec2(hs23,9,9,0) mat2vec2(hs24,9,9,0)];
hs2=hs2./(ones(9 * 9,1) * sqrt(sum(hs2.^2)));
%hv2=(h2' * hs2)';
VQMATS2=(h2' * hs2)';

%VQMATS2=[hv2(5) hv2(5) hv2(1) hv2(5) hv2(1) hv2(5) hv2(5) hv2(1)
%         hv2(5) hv2(5) hv2(1) hv2(5) hv2(1) hv2(5) hv2(5) hv2(1)]';
%VQMATS2=(VQMATS2./(ones(9,1) * sqrt(sum(VQMATS2.^2))));

Saccade6.m

```
oy=(sy-3)/2;
FLG3=0;
gaze=init_gaze;
Level=3;

INPUT=-1/3ones(27);
INPUT=impatch2(hs21,INPUT,14+i*14,1,0);
INPUT=impatch2(hs23,INPUT,23+i*23,1,0);

STM1=1/NUMO0*ones(NUMO0,1)*ones(1,sx1*sy1);
STM2=1/NUMO1*ones(NUMO1,1)*ones(1,sx1*sy1);
MIF1=zeros(sx,sy);
MIF2=zeros(sx,sy);
CTR1=round(sx1/2)+i*round(sy1/2);
CTR2=round(sx1/2)+i*round(sy1/2);
PNT1=CTR1;
PNT2=CTR2;
seq_gaze=init_gaze;
seq_yc1=[];
seq_yc2=[];
STAGE1=0;
STAGE2=0;

for t=1:itr
x0=extract2(INPUT,0,gaze,3,3);
x1=extract2(INPUT,0,gaze,9,9);
x1=subsamp1(filter2(fh1,x1,'same'),3);
x2=extract2(INPUT,0,gaze,27,27);
x2=subsamp1(filter2(fh2,x2,'same'),9);
x2=mat2vec2(x2,3,3,0);
x1=mat2vec2(x1,3,3,0);
x0=mat2vec2(x0,3,3,0);
if sum(x0)~=0
    x0=x0/sqer(sum(sum(x0.^2)));
end ys0=VQMAT0'*x0;
[mmx,mmy]=detmax(ys0);
```

FIG.32

Saccade6.m

```
if mmx~=-1+i*(-1)        % this assumes any level-0 pattern can be classified by one level-0 observation.
  STM1(:,(imag(PNT1)-1)*sx1+real(PNT1))=zeros(NUMO0,1);
  STM1(real(mmx),(imag(PNT1)-1)*sx1+real(PNT1))=1;
else
end
for m=-1:1
  for n=-1:1
    dys=zeros(NUMO0,1);
    for indx=1:NUMO0
      if x1((m+2)+(n+1)*3)>=VQMATS1(indx,1)*0.99 & x1((m+2)+(n+1)*3)<=VQMATS1(indx,1)*1.01
        dys(indx,1)=1;
      end
    end
    if sum(dys)~=0
      dys=dys/sum(dys);
    else
      dys=ones(NUMO0,1);
    end
    STM1(:,(imag(PNT1)+n-1)*sx1+real(PNT1)+m=STM1(:,(imag(PNT1)+n-1)*sx1+real(PNT1)+m)) ;
    sSTM1=sum(STM1(:,(imag(PNT1)+n-1)*sx1+real(PNT1)+m));
    if sSTM1~=0
      STM1(:,(imag(PNT1)+n-1)*sx1+real(PNT1)+m)=STM1(:,(imag(PNT1)+n-1)*sx1+real(PNT1)+m)/sSTM1;
    end
  end
end MIF1=zeros(sx,sy);
CMBMAT=zeros(sx,sy);
yyc1=zeros(NUMO1,1);
for mm=1:3
  for nn=1:3
    stm1=[];
    for mmm=0:2
      for nnn=0:2
        stm1=[stm1 STM1(:,(mm+1+mmm-1)*sx1+nn+1+nnn)];
      end
    end
    yc1=prod(sum(mat2vec2(VQMATC1(:,1),NUMO0,3*3,1).*stm1)');
```

FIG.33

Saccade6.m

```
yc1=[yc1;prod(sum(mat2vec2(VQMATC1(:,:2),NUMO0,3*3,1).*stm1)')];
yc1=[yc1;prod(sum(mat2vec2(VQMATC1(:,:3),NUMO0,3*3,1).*stm1)')];
yc1=[yc1;prod(sum(mat2vec2(VQMATC1(:,:4),NUMO0,3*3,1).*stm1)')];
stm1=mat2vec2(stm1,NUMO0,3*3,0);
MIF1(mm:mm+mmm,nn:nn+nnn)=MIF1(mm:mm+mmm,nn:nn+nnn)+mutinf1(VQMATC1,yc1,stm1,3,3);
if sum(abs(MIF1))>eps
   yyc1=yyc1+yc1;
   CMBMAT(mm:mm+mmm,nn:nn+nnn)=CMBMAT(mm:mm+mmm,nn:nn+nnn)+ones(3);
end
end
end
for m=1:sx
   for n=1:sy
      if CMBMAT(m,n)==0
         CMBMAT(m,n)=1;
      end
   end
end
MIF1=MIF1./CMBMAT;

if sum(yyc1)>eps
   yyc1/sum(yyc1);
else
   yyc1=ones(NUMO1,1)/NUMO1;
end
[mmx,mmy]=detmax(yyc1);
%_if mmy>=1-eps & mmx~=-1+i*(-1)
if mmy>=crt*1 & mmx~=-1+i*(-1)
   STAGE1=1;
else
end STM2(:,(imag(PNT2)-1)*sx1+real(PNT2))=yyc1;
for m=-1:1
   for n=-1:1
      dys=zeros(NUMO1,1);
      for indx=1:NUMO1
         if x2((m+2)+(n+1)*3)>=VQMATS2(indx,1)*0.99 & x2((m+2)+(n+1)*3)<=VQMATS2(indx,1)*1.01
```

FIG. 34

Saccade6.m

```
        dys(indx,1)=1;
      end
    end
    if sum(dys)~=0
      dys=dys/sum(dys);
    else
      dys=ones(NUMO1,1);
    end
    STM2(:, (imag(PNT2)+n-1) * sx1+real(PNT2)+m)=STM2(:, (imag(PNT2)+n-1) * sx1+real(PNT2)+m). * dys;
    sSTM2=sum(STM2(:,(imag(PNT2)+n-1) * sx1+real(PNT2)+m));
    if sSTM2~=0
      STM2(:, (imaga(PNT2)+n-1) * sx1+real(PNT2)+m)=STM2(:, (imag(PNT2)+n-1) * sx1+real(PNT2)+m)/sSTM2;
    end
  end
end MIF2=zeros(sx,sy);
CMBMAT=zoros(sx,sy);
yyc2=0;
for mm=1:3
  for nn=1:3
    stm2=[];
    for mmm=0:2
      for nnn=0:2
        stm2=[stm2 STM2(:, (mm+1+mmm-1) * sx1+nn+1+nnn)];
      end
    end
    yc2=prod(sum(mat2vec2(VQMATC2(:,1),NUMO1,3 * 3,1). * stm2)');
    yc2=[yc2;prod(sum(mat2vec2(VQMATC2(:,2),NUMO1,3 * 3,1) * stm2)')];
    stm2=mat2vec2(stm2,NUMO1,3 * 3,0);
    MIF2(mm:mm+mmm,nn:nn+nnn)=MIF2(mm:mm+mmm,nn:nn+nnn)+mutinf1(VQMATC2,yc2,stm2,3,3);
    if sum(sum(abs(MIF1)))>eps
      yyc2=yyc2+yc2;
      CMBMAT(mm:mm+mmm,nn:nn+nnn)=CMBMAT(mm:mm+mmm,nn:nn+nnn)+ones(3);
    end
  end
end
for m=1:Sx
```

FIG.35

Saccade6.m

```
for n=1:sy
    if CMBMAT(m,n)==0
        CMBMAT(m,n)=1;
    end
end
MIF2=MIF2./CMBMAT;

if sum(yyc2)>eps
    yyc2=yyc2/sum(yyc2);
else
    yyc2=ones(NUMO2,1)/NUMO2;
end
[mmx,mmy]=detmax(yyc2);
% if mmy>=1-eps & mmx~=-1+i*(-1)
if mmy>=crt*1 & mmx=~-1+i*(-1)
    STAGE2=1;
else
end seq_yc1=[seq_yc1 yyc1];
seq_yc2=[seq_yc2 yyc2];
if STAGE2==1
    break;
else
    [dx2,dy2]=detmax(MIF2);
    [dx1,dy1]=detmax(MIF1);
    if dx1==-1+i*(-1) | STAGE1==1
        PNT1=CTR1;
        if dx2==-1+i*(-1)
            mat2vec2(x2,3,3,1);
            [dgaze,dy1]=detmax(abs(x2));
            PNT2=CTR2;
        else
%           dgaze=(dx2-(3+i*3))3^2;
%           PNT2=CTR2+dx2-(3+i*3);
%       end
        nSTM1=1/NUMO0*ones(NUMO0,1)*ones(1,sx1*sy1);
```

FIG.36

Saccade6.m

```
for mm=1:sx1
  for nn=1:sy1
    if real((mm+i*nn)-dgaze/3)>=1 & real((mm+i*nn)-dgaze/3)<=sx1
      if imag((mm+i*nn)-dgaze/3)>=1 & imag((mm+i*nn)-dgaze/3)<=sy1
        nSTM1(mm,nn)=STM1(real((mm+i*nn)-dgaze/3),imag((mm+i*nn)-dgaze/3));
      end
    end
  end
end
STM1=nSTM1;
STAGE1=0;
else
  dgaze=(dx1-(3+i*3))*3^1;
  PNT1=CTR1+dx1-(3+i*3);
end
gaze=init_gaze+(PNT2-CTR2)*3^2+(PNT1-CTR1)*3^1;
seq_gaze=[seq_gaze;gaze];
gaze
  end
end
% end of list
```

FIG. 37

Mutinf.m

```
function mif=mutinf(MAT,Y,X,ax,ay)

PY=Y;

mif=zeros(ax,ay);
SMAT=sum(MAT')  % summing every row vector
[M,N]=size(SMAT);
for n=1:N
    if SMAT(1,n)==0
        SMAT(1,n)=1;
    else
    end
end
[M,N]=size(MAT);
PMAT=MAT./(SMAT'*ones(1,N));       % confitional probability of X for Y

[xM,xN]=size(X);
num_X=xM/(ax*ay);
[yM,yN]=size(Y);
for m=1:ax
    for n=1:ay
        for indX=1:num_X
            px=X((n-1)*ay+m-1)*num_X+indX,1);
            enty=0;
            for indY=1:yM
                py=PMAT(((n-1)*ay+m-1)*num_X+indX,indY);
                if py==0
                    iy=0;
                else
                    iy=-py*log(py);
                end
                for mm=1:ax
                    for nn=1:ay
                        if m==mm & n==nn
                        else
                            iy=iy*MAT(((nn-1)*ay+mm-1)*num_X+1:
                                ((nn-1)*ay+mm)*num_X,indY)'*X(((nn-1)*ay+mm-1)*num_X+1:((nn-1)*ay+mm)*num_X,1);
                        end
```

FIG.38

Mutinf.m

```
          end
        end
      enty=enty+iy
    end
    mif(m,n)=mif(m,n)-px * enty;
  end for indY=1:yM
    py=0;
    for indX=1:num_X
      py=py+PMAT(((n-1) * ay+m-1) * num_X+indX,indY) * X(((n-1) * ay+m-1) * num_X+indX,1);
    end
    if py==0
      iy=0;
    else
      iy=-py * log(py);
    end
    for mm=1:ax
      for nn=1:ay
        if m==mm & n==nn
        else
          iy=iy * MAT(((nn-1) * ay+mm-1) * num_X,+1:
               ((nn-1) * ay+mm) * num_X,indY)' * X(((nn-1) * ay+mm-1) * num_X+1:((nn-1) * ay+mm) * num_X,1);
        end
      end
    end
    mif(m,n)=mif(m,n)+iy;
  end
end
% end of list
```

FIG.39

Extract2.m

```
% extract2 maps a given image into subspace of the multi-resolution representation.
% Y=extract2(X,L,a,sx,sy)
% Y: resulting image.
% X: an image.
% L: a MRR level of interest.
% a: gaze position in the complex plane.
% sx: x-size of Y.
% sy: y-size of Y.
function Y= extract2(X,L,a,sx,sy)
[M,N]= size(X);
XOrg=round(M/2)+i*round(N/2);
sOrg=ronnd(sx/2)+i*round(sy/2);
LOrg=round(3^L/2)+i*round(3^L/2);
W=zeros(sxs+2,sy+2);
count=0;
for y=1:sy+2
  for x=1:sx+2
    cc=a+((x+i*y)-sOrg-(1+i)*3^L;
    for dy=1:3^L
      for dx=1:3^L
        ccc=cc+((dx+i*dy)+LOrg);
        if (real(ccc)>=1) & (real(ccc)<M) & (imag(ccc)>=1) & (imag(ccc)<=N)
          W(x,y)=W(x,y)+X(real(ccc),imag(ccc)*3^(-2*L);
        else
        end
      end
    end
  end
end
Y=W(2:sx+1,2:sy+1);
%Y=filter2(fspecial('laplacion',0.5),W,'valid');
% kernel=[0 0 0; 0 1 0; 0 0 0];
% Y=filter2(kernel,W,valid);
% Y=Y.*3^(-2*L);
```

FIG.40

Subsampl.m

```
function Y=subsampl(X,s)

[M,N]=size(X);
for m=1:fix(M/s)
  for n=1:fix(N/s)
    Y(m,n)=X((m-1)*s+round(s/2),(n-1)*s+round(s/2));
  end
end
```

APPARATUS AND METHOD FOR RECOGNIZING A NONUNIFORMLY SAMPLED PATTERN

BACKGROUND OF THE INVENTION

1. Field of the Invention

This invention relates to a pattern recognition apparatus, and more particularly, to a pattern recognition apparatus for controlling parameters in order to efficiently recognize a pattern when an input device included in the apparatus undergoes various kinds of restrictions which can be changed by the parameters.

2. Description of the Related Art

In an image recognition apparatus provided in a robot moving in a three-dimensional space, since it is unknown in which direction an image signal to be recognized is present, the apparatus is requested to input a signal within a range as wide as possible. At the same time, the apparatus is required to have sufficient spatial resolution to recognize a certain pattern. As an image input device which simultaneously satisfies such requirements, a device, which performs nonuniform sampling such that, referring to the characteristics of a human retina, an image near the center of an optical axis is sensed with high resolution and resolution decreases as an image is separated from the optical axis, has been devised.

In such nonuniform sampling, in order to exactly recognize a pattern sampled with low resolution at a portion surrounding an input image, it is necessary to change the optical axis so that the pattern is again sampled in a high-resolution region near the center of the optical axis. That is, nonuniform sampling becomes an effective input method only with optical-axis control.

A method for controlling an optical axis based on features of an input image input according to nonuniform sampling has been devised as an optical-axis control method for the above-described purpose. For example, the absolute value of the slope of an image intensity, an output value after passing through a two-dimensional filter, and the like are used as the features. An optical-axis control method based on a knowledge base has also been devised. In this knowledge-base method, tasks to be executed by a system, and a set of images or patterns to be recognized are expressed by a Bayes network, and an operation to be subsequently performed is determined based on the probability structure in order to efficiently execute given tasks.

As described above, most methods of conventional optical-axis control are based on image signals. Accordingly, an optical axis is controlled only by geometric properties of an image, such as a portion having a large edge intensity or a portion having a large filter output. In such control methods, an optical axis is moved to a portion which is not required for a task if the absolute value of the slope is large. Furthermore, in the above-described knowledge-base method, since the Bayes network is used, the structure of data which can be expressed is limited.

SUMMARY OF THE INVENTION

It is an object of the present invention to provide a pattern recognition method and apparatus which can perform optical-axis control without depending only on geometric properties of an image.

It is another object of the present invention to provide a pattern recognition method and apparatus which can more exactly recognize a pattern.

It is still another object of the present invention to provide a pattern recognition method and apparatus which can correct an optical axis at a high speed.

According to one aspect, the present invention which achieves these objectives relates to a pattern recognition apparatus comprising input means for inputting a first signal representing a pattern to be recognized, sampling means for nonuniformly sampling the first signal input from said input means, recognition means for recognizing the pattern represented by the first signal based on a second signal obtained by the sampling by the sampling means, and changing means for changing a sampling position in nonuniform sampling by the sampling means based on a result of the recognition by the recognition means.

According to another aspect, the present invention which achieves these objectives relates to a pattern recognition method comprising the steps of inputting a first signal representing a pattern to be recognized, nonuniformly sampling the input first signal, recognizing the pattern represented by the first signal based on a second signal obtained by the sampling, and changing a sampling position in nonuniform sampling in the sampling step based on a result of the recognition.

According to still another aspect, the present invention which achieves these objectives relates to a storage medium storing a pattern recognition program comprising the steps of inputting a first signal representing a pattern to be recognized, nonuniformly sampling the input first signal, recognizing the pattern represented by the first signal based on a second signal obtained by the sampling, and changing a sampling position in nonuniform sampling in the sampling step based on a result of the recognition.

Other objectives and advantages besides those discussed above shall be apparent to those skilled in the art from the description of the preferred embodiments of the invention which follows. In the description, reference is made to accompanying drawings, which form a part thereof, and which illustrate examples of the invention. Such examples, however, are not exhaustive of the various embodiments of the invention, and therefore reference is made to the claims which follow the description for determining the scope of the invention.

BRIEF DESCRIPTION OF THE DRAWINGS

FIG. 20 is a diagram illustrating an example of a code book in encoding processing and mapping between the states of cells;

FIGS. 21 and 22 illustrate two-dimensional images for corresponding state vectors;

FIGS. 28 through 36 are diagrams illustrating a main program of two-dimensional digital-image recognition processing software;

FIGS. 37 and 38 are diagrams illustrating a program for calculating mutual information;

FIGS. 39 and 40 are diagrams illustrating a program for extracting a multiresolution partial image.

DESCRIPTION OF THE PREFERRED EMBODIMENTS

Preferred embodiments of the present invention will now be described in detail with reference to the drawings.

First Embodiment

Figure 1:
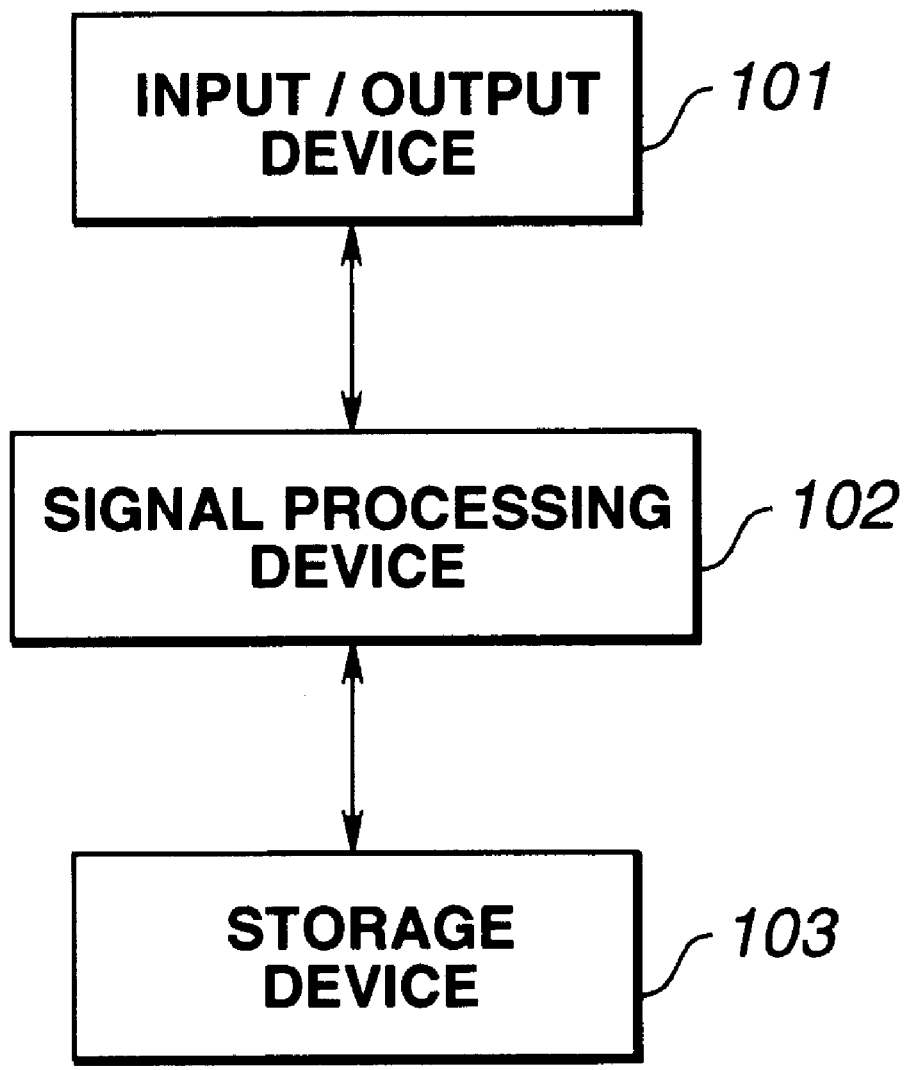
FIG. 1 is a block diagram illustrating the configuration of a pattern recognition apparatus according to a first embodiment of the present invention.

FIG. 1 is a diagram illustrating the configuration of a pattern recognition apparatus according to a first embodiment of the present invention. The first embodiment relates to off-line pattern recognition. Each device of the apparatus may include a dedicated program memory and processor for realizing the function to be described later. Alternatively, the function of each of a plurality of devices may be realized by executing a corresponding program stored in a ROM (read-only memory), a disk memory or the like, or executing a control program for controlling specific hardware corresponding to the function by the same CPU (central processing unit).

For the purpose of simplification, the following description will be adopted.

That is, if a symbol * appears in one of indices, that indicates a vector having all values for that index as elements. If symbols * appear in two of indices, that indicates a matrix having all values for those indices as elements.

For example:

$$A(l, m, n,^*) = (A(l, m, n, 1), A(l, m, n, 2), \cdots, A(l, m, n, W))^2 \quad (1)$$

$$A(l,^*,^*, w) = \begin{pmatrix} A(l, 1, 1, w) & A(l, 1, 2, w) & \cdots & A(l, 1, N, w) \\ A(l, 2, 1, w) & A(l, 2, 2, w) & \cdots & A(l, 2, N, w) \\ \cdots & \cdots & \cdots & \cdots \\ A(l, M, 1, w) & A(l, M, 2, w) & \cdots & A(l, M, N, w) \end{pmatrix}. \quad (2)$$

If ~ appears in an index, that indicates a set having all values for that index. For example:

$$A(l,m,n,\sim)=\{A(l,m,n,1), A(l,m,n,2), \ldots, A(l,m,n,W)\}. \quad (3)$$

The symbol ~ may appear in a plurality of indices.

Since description is provided based on the theory of probability, a function $\lambda$ which outputs a vector normalized so that the sum of finite-dimensional vectors $(z(1), z(2), \ldots, z(N))^T$ constituted by finite non-negative elements is 1 is defined according to the following equation:

$$\lambda(z) \begin{cases} = (z(1)/Z, z(2)/Z, \cdots, z(N)/Z)^T & \text{if } Z \neq 0 \\ = (1/N, 1/N, \cdots, 1/N)^T & \text{otherwise,} \end{cases} \quad (4)$$

where Z is the sum of the elements of the vector:

$$Z = \sum_{n=1}^{n=N} z(n). \quad (5)$$

Each device of the pattern recognition apparatus shown in FIG. 1 will now be described.

Input/Output Device 101

An input/output device 101 receives a signal to be recognized, and transmits the received signal to a signal processing device 102. The input/output device 101 also transmits a result of recognition obtained by processing by the signal processing device 102 to an external apparatus.

A signal input from an external apparatus is a signal to be recognized, and may be a one-dimensional signal, such as a voice signal, or a two-dimensional signal, such as an image signal. In the first embodiment, the input signal is assumed to be a two-dimensional signal I(*,*).

Signal Processing Device 102

The signal processing device 102 recognizes a two-dimensional signal trasmitted from the input/output device 101 in an ordinary mode. In a learning mode, the signal processing device 102 stores knowledge data for recognition in a storage device 103 in the form of a quantization code book (to be described later) or the like based on a two-dimensional signal and a supervisor signal transmitted from the input/output device 101.

Figure 2:
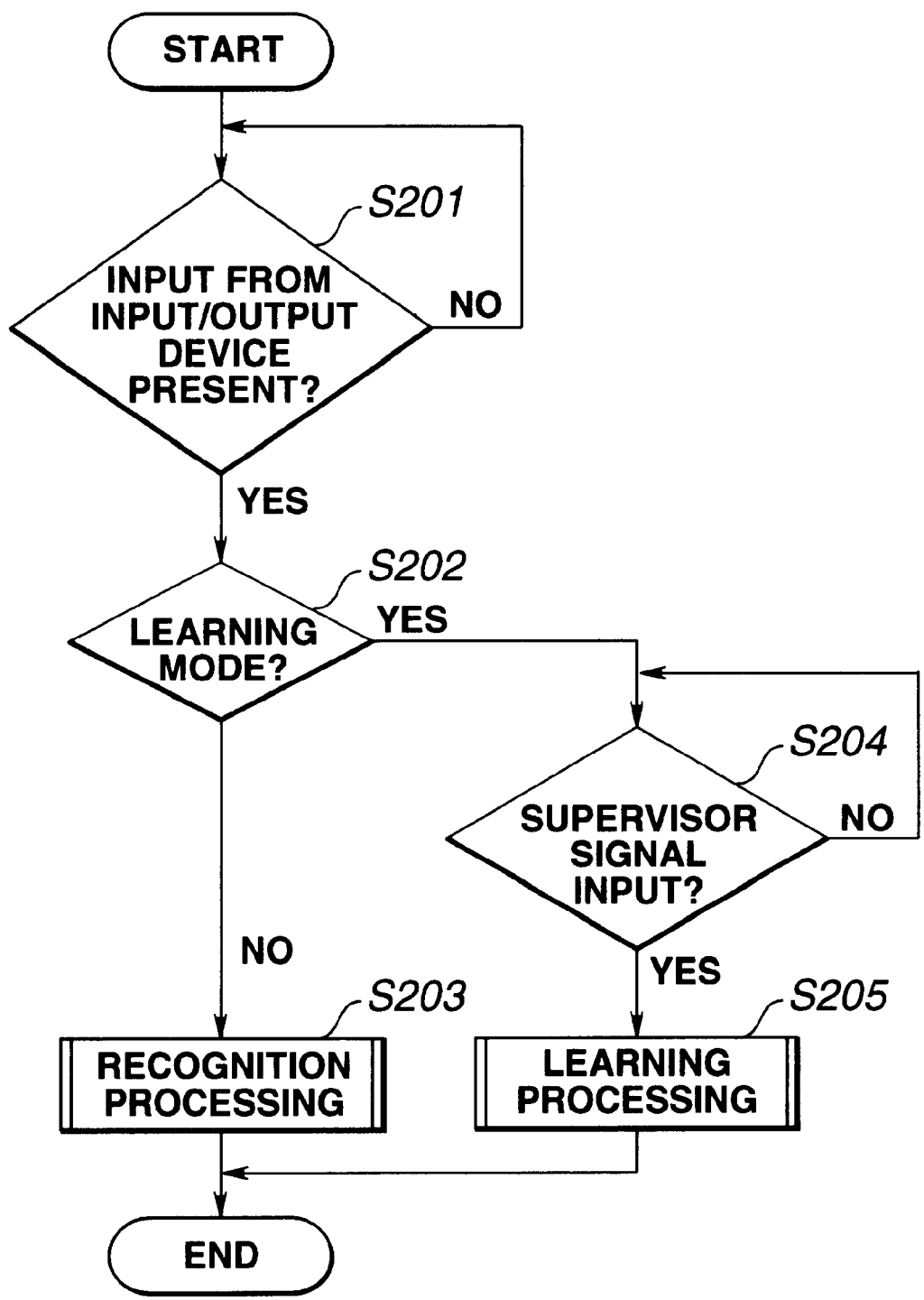
FIG. 2 is a flowchart illustrating the processing of a signal processing device shown in FIG. 1.

FIG. 2 is a flowchart illustrating the processing of the signal processing device 102.

In step S201, it is determined if there is an input from the input/output device 101. If the result of the determination is negative, the process of step S201 is repeated. If the result of the determination is affirmative, the process proceeds to step S202, where it is determined if the current mode is a learning mode. If the result of the determination in step S202 is affirmative, the process proceeds to step S204. If the result of the determination in step S202 is negative, the process proceeds to step S203, where recognition processing is executed. The recognition processing will be described later with reference to FIGS. 3 and 4. In step S204, it is determined if a supervisor signal has been input. If the result of the determination in step S204 is affirmative, the process proceeds to step S205, where learning processing is performed. If the result of the determination in step S204 is negative, the processing of step S204 is repeated. The learning processing will be described later with reference to FIG. 26.

Figure 3:
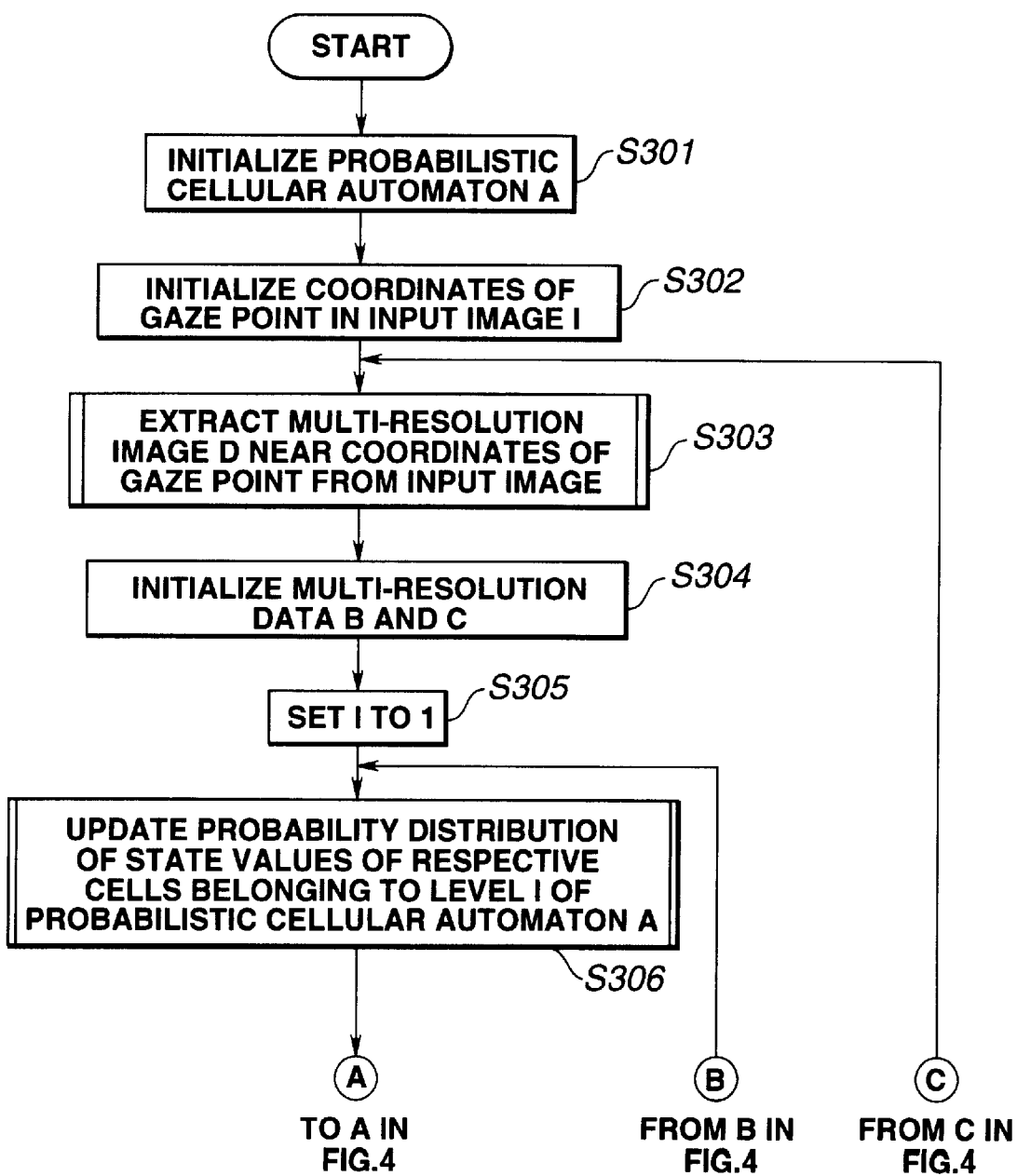
FIGS. 3 and 4 are flowcharts illustrating recognition processing.

Next, the flow of the recognition processing executed in step S203 will be described with reference to the flowcharts shown in FIGS. 3 and 4.

First, in step S301, a probabilistic cellular automaton A is initialized. The probabilistic cellular automaton A is expressed by four elements, i.e., a cell space $Z^d$, a probability space Q defined on a set $\Omega$ of the states of respective cells, a neighborhood system X, and a mapping $\phi$:

$$A=\{Z^d, Q, X, \phi\}. \quad (6)$$

In the first embodiment, since a hierarchical structure is considered, d=3 in the cell space $Z^d$, i.e., $(l,m,n) \in Z^3$, where l represents a hierarchical level, and (m,n) represents a two-dimensional spatial position corresponding to a two-dimensional image. The set of the states of cells may generally be considered as a set of natural numbers when the state values are countable. If the state values are limited to a finite number, the probability distribution P of the state values is given as the probability for a state value 1, the probability for a state value 2, . . . , which can be expressed as a finite-dimensional vector as a whole.

The neighborhood system X(l,m,n) for a cell positioned at coordinates (l,m,n) in a cell space is defined, for example, as:

$$X(l, m, n) = \quad (7)$$
$$\{(l-1, 3m-1, 3n-1), (l-1, 3m-1, 3n), (l-1, 3m-1, 3n+1),$$
$$(l-1, 3m, 3n-1), (l-1, 3m, 3n), (l-1, 3m, 3n+1), (l-1,$$
$$3m+1, 3n-1), (l-1, 3m+1, 3n), (l-1, 3m+1, 3n+1)\}.$$

The mapping $\phi$ is given by the following equation using the probability $P_{l,m,n}(\mu=v)$ for the state value $\mu$ of a cell positioned at (l,m,n) in the cell space to be v, the probability $P_{i,j,k}(\omega=w)$ for the state value $\omega_{i,j,k}$ for a cell (i,j,k) included in the neighborhood system defined by equation (7) to be w, and the conditional probability for these probabilities $\pi_{i,j,k}(u=v|\omega=w)$:

$$P_{l,m,n}(\mu = v) = \phi(\{P_{i,k,k}(\omega = w), (i, j, k) \in X(l, m, n)\}) = \quad (8)$$
$$\prod_{(i,j,k) \in X(l,m,n)} \sum_{w \in \Omega} \pi_{i,j,k}(\mu = v \mid \omega = w) P_{i,l,k}(\omega = w).$$

Figure 8:
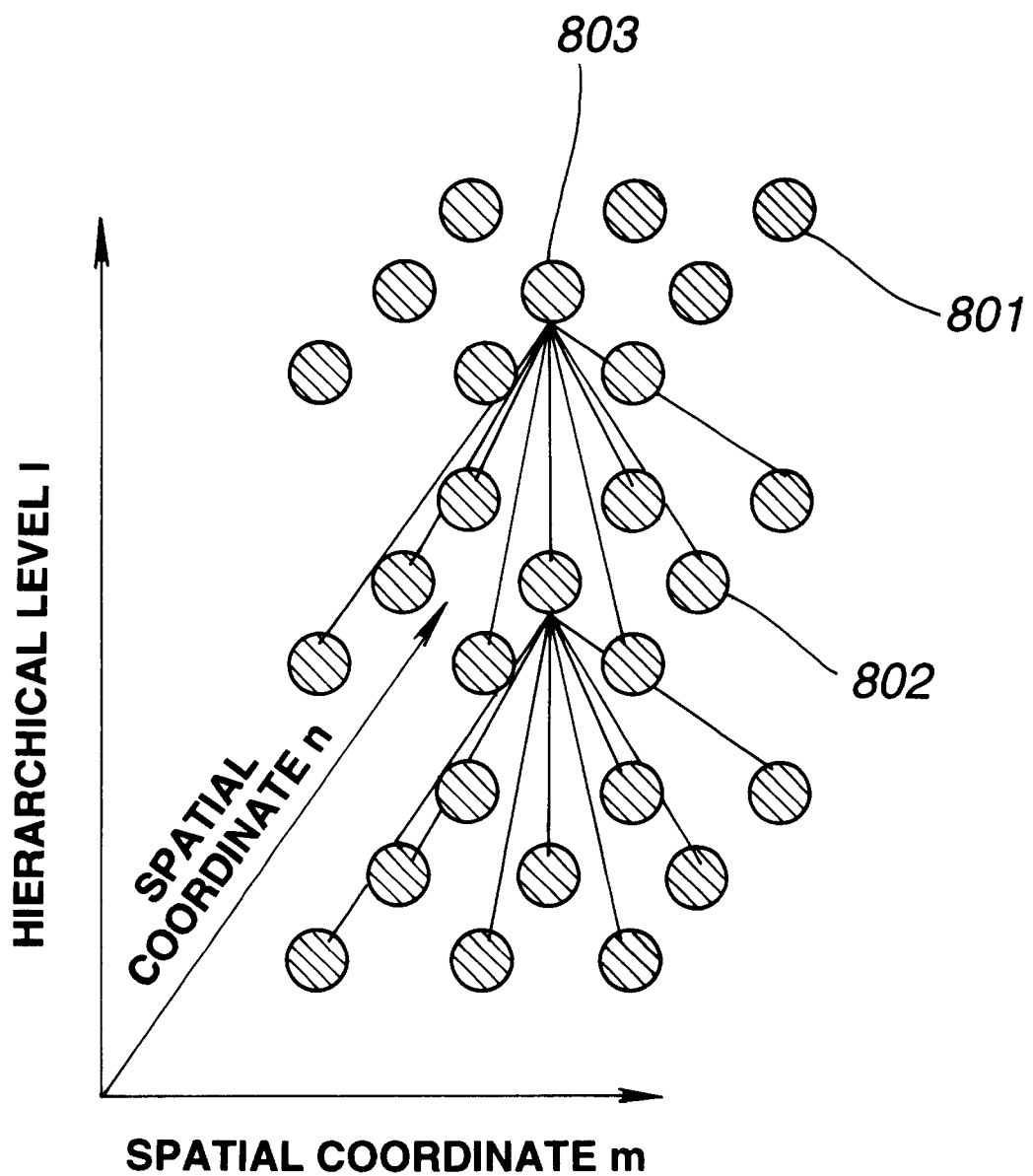
FIG. 8 is a diagram illustrating a cell space of a probabilistic cell automaton.

FIG. 8 illustrates the structure of the probabilistic cellular automaton A when l={1,2,3}, m={−1,0,1}, and n={−1,0,1}. In FIG. 8, a hierarchical level l is represented in a vertically upward direction, a spatial coordinate m is represented in a horizontally rightward direction, and a spatial coordinate m is represented in an obliquely upward direction. The coordinates of cells 801 and 802 in the cell space are (3,1,1) and (2,1,0), respectively. The neighborhood system is indicated by solid lines. For example, the neighborhood system X(3, 0,0) of a cell (3,0,0) is:

$$X(3, 0, 0) = \{(2, -1, -1), (2, -1, 0), (2, -1, 1), \quad (9)$$
$$(2, 0, -1), (2, 0, 0), (2, 0, 1)(2, 1, -1), (2, 1, 0), (2, 1, 1)\}.$$

In the following description, the ranges of the resolution level l, the two-dimensional spatial positions m and n, and the index w for the state value $\omega$ of each cell are set to be:

$$l=\{1,2,\ldots,L\}$$
$$m=\{-M_D,-M_D+1,\ldots,0,\ldots,M_D-1,M_D\}$$
$$n=\{-N_D,-N_D+1,\ldots,0,\ldots,N_D-1,N_D\}$$
$$w=(1,2,\ldots,W\}. \quad (10)$$

Using the index expressed by (10), the probability $P_{l,m,n}(\omega=W)$ for the state value $\omega$ of a cell having hierarchical level l and positioned at two-dimensional spatial position (m,n) to be w is:

$$P_{l,m,n}(\omega=w)=A(l,m,n,w). \quad (11)$$

The probability distribution of the state value of the cell (l,m,n) can be described as W-dimensional vector A(l,m,n, *). The mapping $\phi$ can be redefined as follows:

$$A(l, m, n,^*) = \lambda((A(l, m, n, 1), A(l, m, n, 2), \cdots, A(l, m, n, W))^T), \quad (12)$$
$$A(l, m, n, w) = \phi(\{A(i, j, k,^*),$$
$$(i, j, k) \in X(l, m, n)\}) = \prod_{(i,j,k) \in X(l,m,n)}$$
$$< \Psi(l, m, n, w \mid i, j, k,^*) | A(i, j, k,^*) >,$$

where <a|b> is the inner product of vectors a and b, and $\psi(l,m,n,w|i,j,k,*)$ is a W-dimensional vector defined by the following equation:

$$\psi(l,m,n,w|i,j,k,^*)=((\psi(l,m,n,w|i,j,k,1),\ldots,$$
$$\psi(l,m,n,w|i,j,k,W))^T. \quad (13)$$

$\Psi(l,m,n,w|i,j,k,v)$ is the conditional probability for the state value of the cell (l,m,n) to be w when the state value of a cell (i,j,k) is v.

FIG. 20 shows an example of a mapping $\psi(l,m,n,w|l-1, j,k,v)$. In FIG. 20, the neighborhood system X(l,m,n) for the cell (l,m,n) is expressed by a square comprising 3×3 blocks. A numeral written under each square represents the state value w of the cell (l,m,n). Each numeral within the corresponding block indicates the state value v of the corresponding cell included in the neighborhood system X(l,m,n). For example, blocks above a numeral 11 represent the spatial distribution of state values of the neighborhood system corresponding to the state value 11 of the cell (l,m,n), and the state value of the cell at the upper left is required to be 8.

If the coordinates of the cell at the upper left are (l−1,1,1), $\psi(l,m,n,w|l-1,1,1,*)$ in equation (12) becomes a W-dimensional vector in which only the eigth element is 1 and other elements are 0:

$$\psi(l,m,n,w|l-1,1,1,^*)=(0,0,0,0,0,0,0,1,0,0,\ldots,0)^T. \quad (14)$$

If indices in blocks are expressed by the notation of an ordinary matrix, equation (12) can be calculated as follows:

$$A(l, m, n, w) = \quad (15)$$
$$\psi(l, m, n, w \mid l-1, 1, 1,^*)A(l-1, 1, 1,^*)^T \times$$
$$\psi(l, m, n, w \mid l-1, 1, 2,^*)A(l-1, 1, 2,^*)^T \times$$
$$\psi(l, m, n, w \mid l-1, 1, 3,^*)A(l-1, 1, 3,^*)^T \times$$
$$\psi(l, m, n, w \mid l-1, 2, 1,^*)A(l-1, 2, 1,^*)^T \times$$
$$\psi(l, m, n, w \mid l-1, 2, 2,^*)A(l-1, 2, 2,^*)^T \times$$
$$\psi(l, m, n, w \mid l-1, 2, 3,^*)A(l-1, 2, 3,^*)^T \times$$
$$\psi(l, m, n, w \mid l-1, 3, 1,^*)A(l-1, 3, 1,^*)^T \times$$
$$\psi(l, m, n, w \mid l-1, 3, 2,^*)A(l-1, 3, 2,^*)^T \times$$
$$\psi(l, m, n, w \mid l-1, 3, 3,^*)A(l-1, 3, 3,^*)^T.$$

Returning to FIG. 3, in step S302, the coordinates g=(gx, gy) of a gaze point in the input image I is initialized to gint=(gxint,gyint).

The gaze point is the central point of a window for extracting a multiple-resolution image D (to be described later) from the input image I. In order to be coordinated to the multiple-resolution image, the gaze point is expressed by multiple-resolution expression. The scale of the multiple-resolution image used in the first embodiment changes with the third power. Hence, the coordinates of the gaze point are also described with the third power, i.e., ternary numbers:

$$gx = gxint + \sum_{j=0}^{j=L} gxj3^j, \quad gy = gyint + \sum_{j=0}^{j=L} gyj3^j, \quad (16)$$

where gxj and gyj can have values $\{1,2,3\}$ or $\{-1,0,1\}$. When the scale conversion of the multiple-resolution image is based on the second power, the coordinates of the target value are described with binary numbers.

Figure 9:
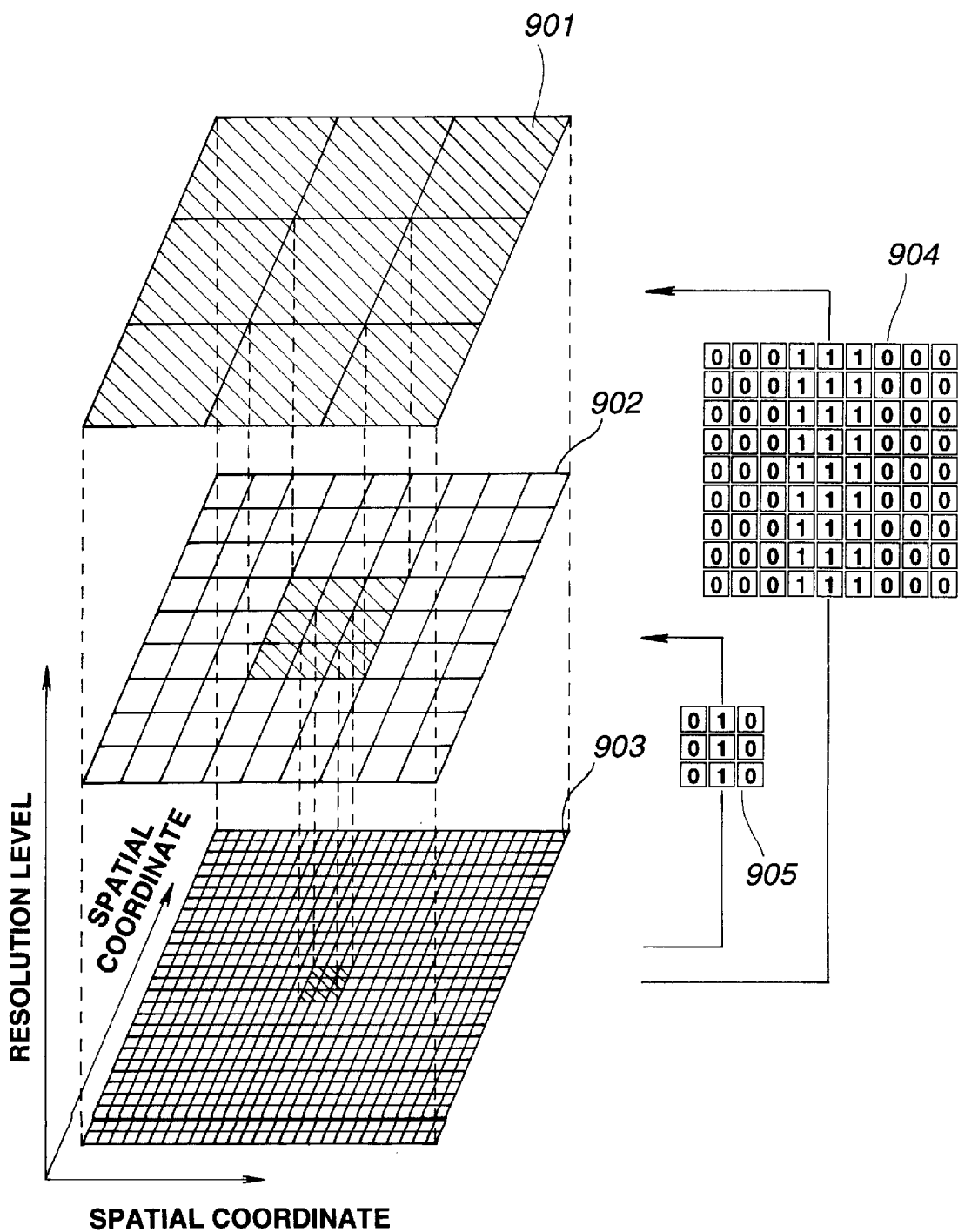
FIG. 9 is diagram illustrating a multiple-resolution partial image.

In step S303, a multiresolution image D in the vicinity of the coordinates of the target point is extracted from the input image. This processing will be described later with reference to FIGS. 5 through 7. Elements of the multiresolution image D are expressed as D(l,m,n) using a subscript l representing the resolution level, and two subscripts (m,n) representing a spatial position relative to the coordinates of the target point. Portions painted in black in FIG. 9 are examples of multi-resolution images D when l=$\{0,1,2\}$, m=$\{-1,0,1\}$ and n=$\{-1,0,1\}$. In the following description, as in the case of the probabilistic cell automaton, the ranges of the resolution level l, and the two-dimensional spatial positions m and n are set to be:

$l=\{0,1,\ldots,L-1\}$ $m=\{-M_D,-M_D+1,\ldots,0,\ldots,M_D-1,M_D\}$ $n=\{-N_D,-N_D+1,\ldots,0,\ldots,N_D-1,N_D\}.$ (17)

As is apparent from the above-described equation and FIG. 9, the multiple-resolution image described in the first embodiment is a partial image of an ordinary multiresolution image. In FIG. 9, there are shown images 901, 902 and 903 belonging to resolution levels 2, 1 and 0, respectively. The spatial region occupied by 9 pixels at level l coincides with the spatial region occupied by a pixel positioned at the center of an image at level l+1.

A multiresolution image may be configured according to some methods. In one method, a mean value over a spatial region occupied by respective pixels is made to be a pixel value for an input image. In another method, coefficients obtained using integral kernels having different spatial scales such as wavelet transform are made to be pixel values. In the case of FIG. 9, integral kernels 904 and 905 are used.

Returning to FIG. 3, in step S304, multiresolution data B and C are initialized. As in the above-described case of D, elements of B and C are expressed by three subscripts as B(l,m,n) and C(l,m,n), and the ranges of the subscripts are:

$l=\{1,\ldots,L-1\}$ $m=\{-M_B,-M_B+1,\ldots,0,\ldots,M_B-1,M_B\}$ $n=\{-N_B,-N_B+1,\ldots,0,N_B-1,N_B\}.$ (18)

In the following description, in some cases, $M_D$ and $N_D$ are set to 1, and $M_B$ and $N_B$ are set to 2.

Figure 11:
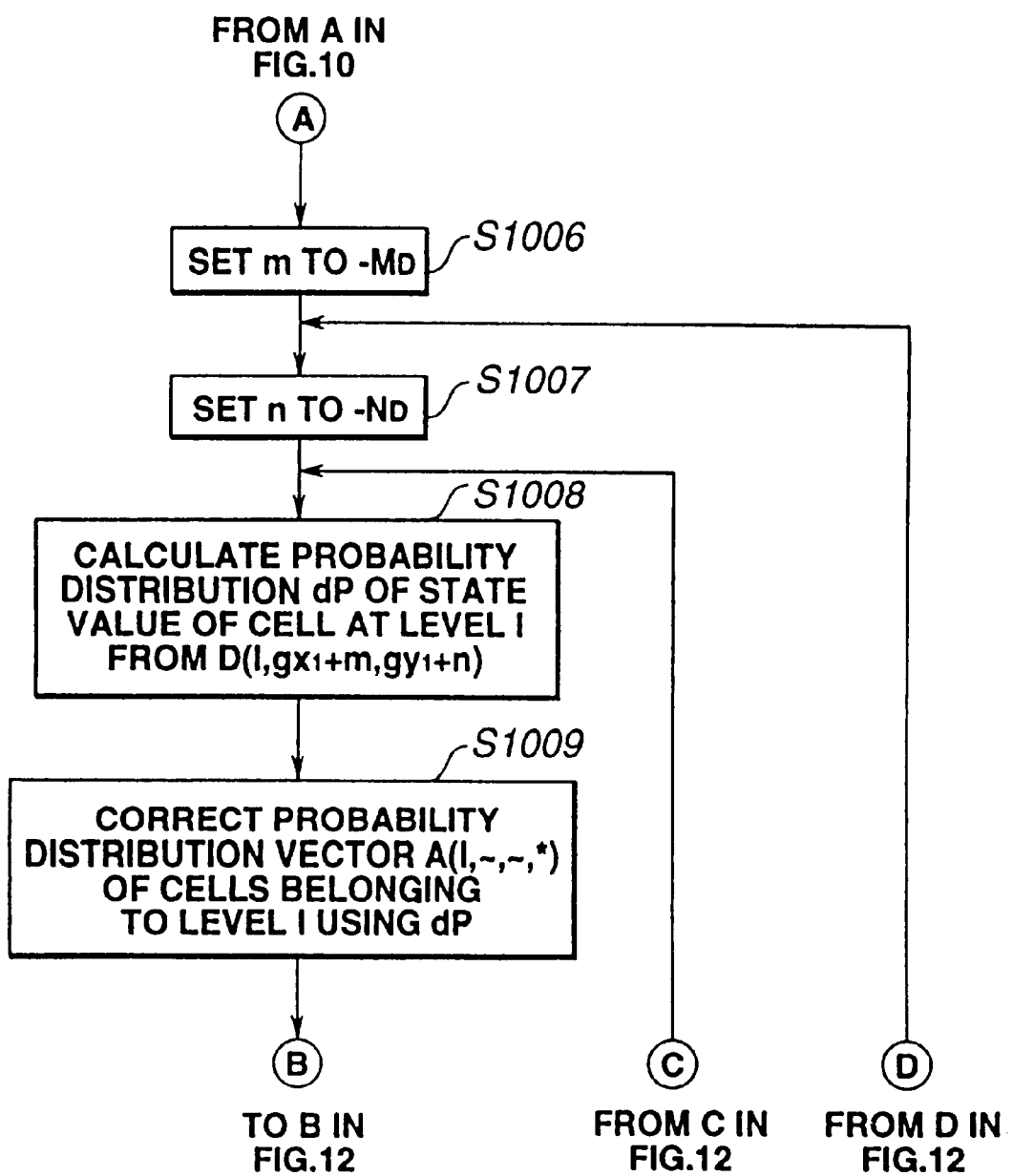
Figure 12:
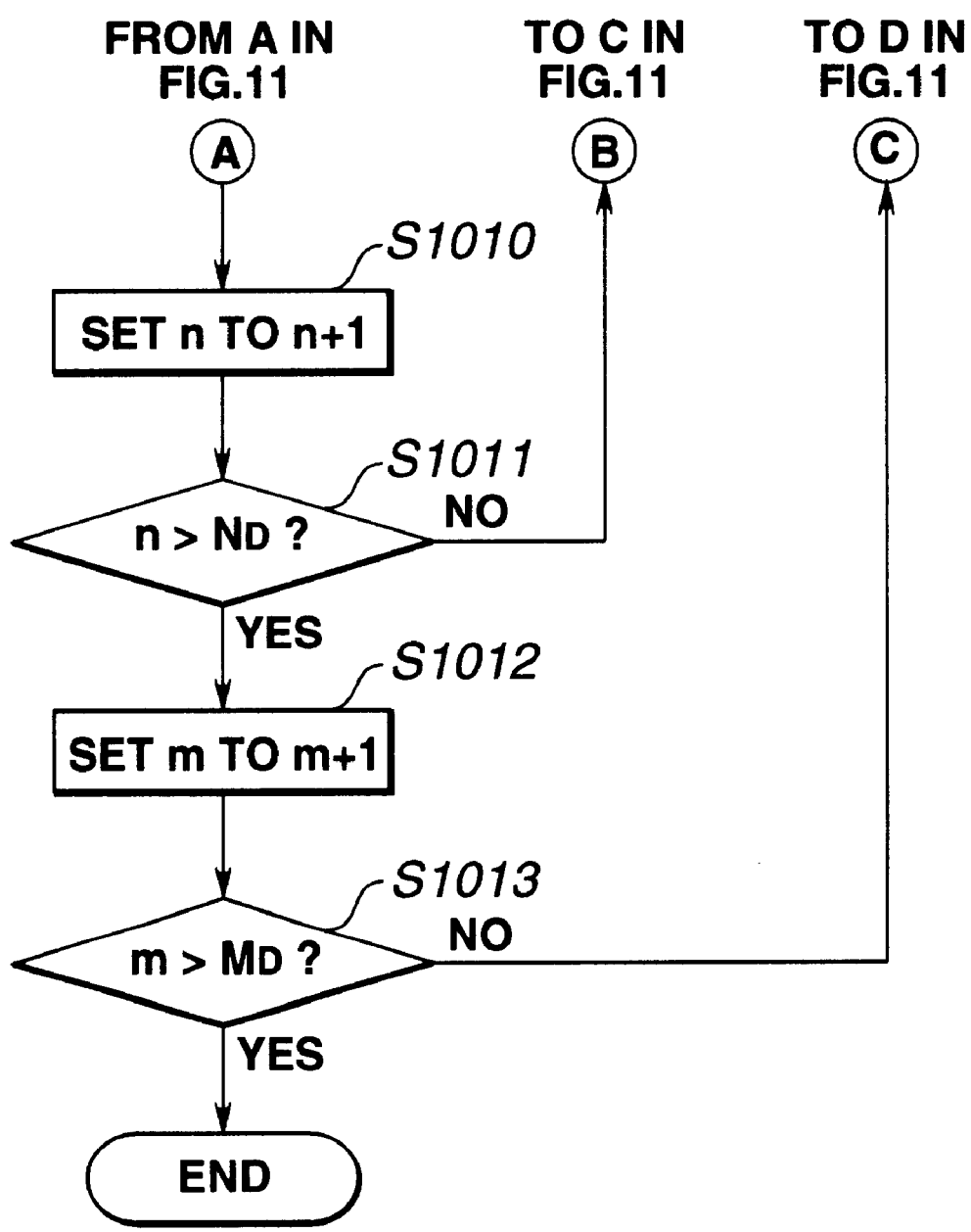

In step S305, l is set to 1. In step S306, the probability distribution (W-dimensional vector) A(l,~,~,*) of the state values of cells A(l,~,~,~) belonging to level l (9 in the case of the first embodiment) from among cells of the probabilistic cellular automaton A is updated. The processing of updating the probability distribution A(l,~,~,*) will be described later with reference to FIGS. 10 through 12.

In step S307, mutual information between cells at level l and cells at level l+1 of the probabilistic cellular automaton A is calculated and the obtained value is stored as B. The processing of calculting mutual information will be described later with reference to FIGS. 14 through 16.

In step S308, l is updated to l+1. In step S309, it is determined if level l exceeds L. If the result of the determination is affirmative, the process proceeds to step S310. If the result of the determination is negative, the process proceeds to step S305.

In step S310, the entropy ε of the probability distribution of the state value ω of a cell to be recognized is calculated according to the following equation:

$$\varepsilon = \sum_{N=1}^{w=W} A(l, m, n, w)\log A(l, m, n, w). \quad (19)$$

In step S311, it is determined if the value of ε calculated according to equation (19) is less than a predetermined value $\varepsilon_c$. If the result of the determination is negative, the process proceeds to step S312. If the result of the determination is affirmative, the recognition processing is terminated, and the state value of the cell to be recognized is determined to be a state value having the maximum probability from the probability distribution of the state value at that time. By referring to correspondence in a correspondence table or a quantization code book (to be described later), a corresponding image is output as the result of recognition from this state value.

In step S312, the coordinates of the target point of the extracted image in the input image are updated using the multiple-resolution data B. This processing will be described later with reference to FIG. 18.

Figure 5:
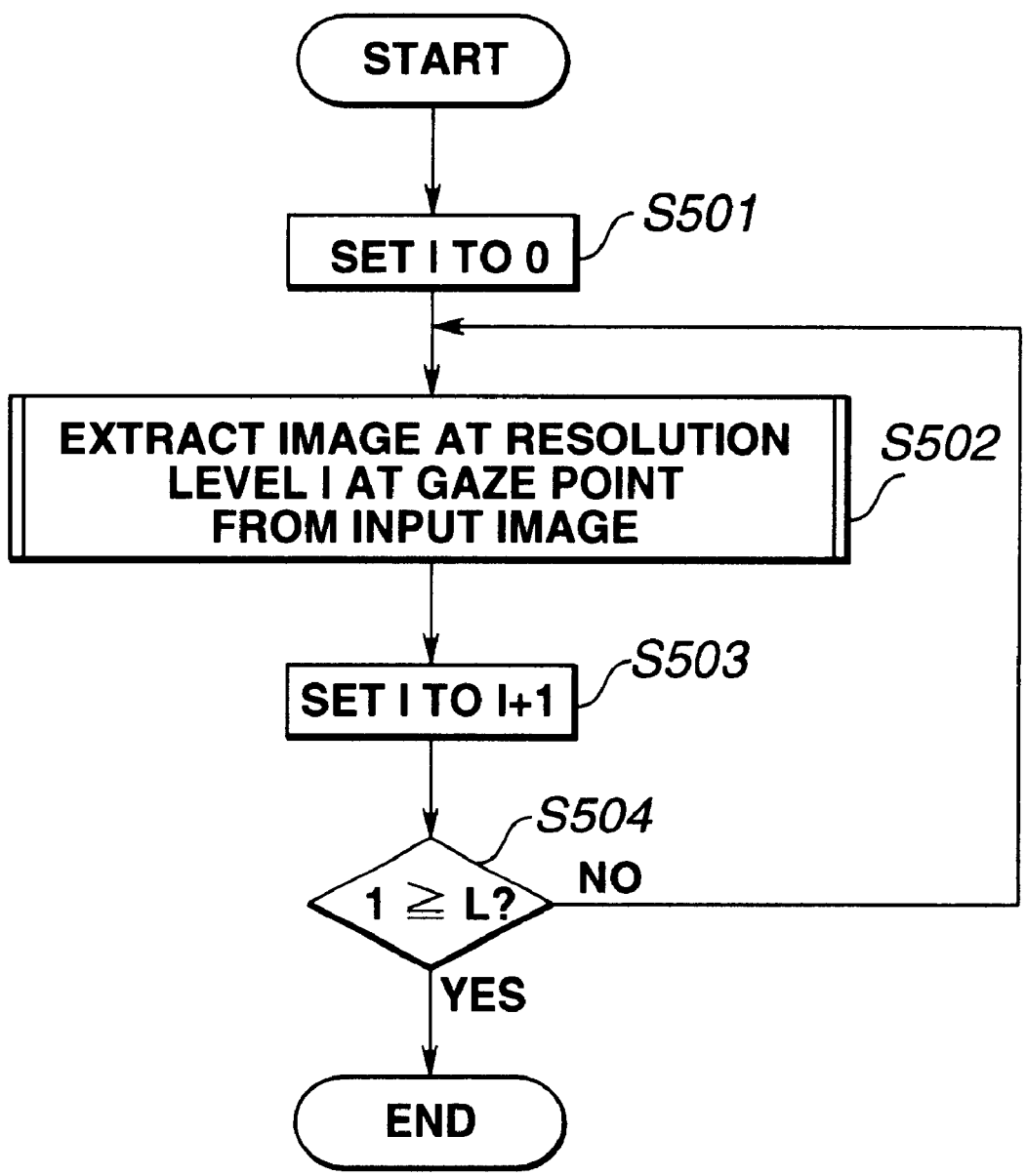
FIG. 5 is a flowchart illustrating processing of extracting a multiresolution partial image.
Figure 6:
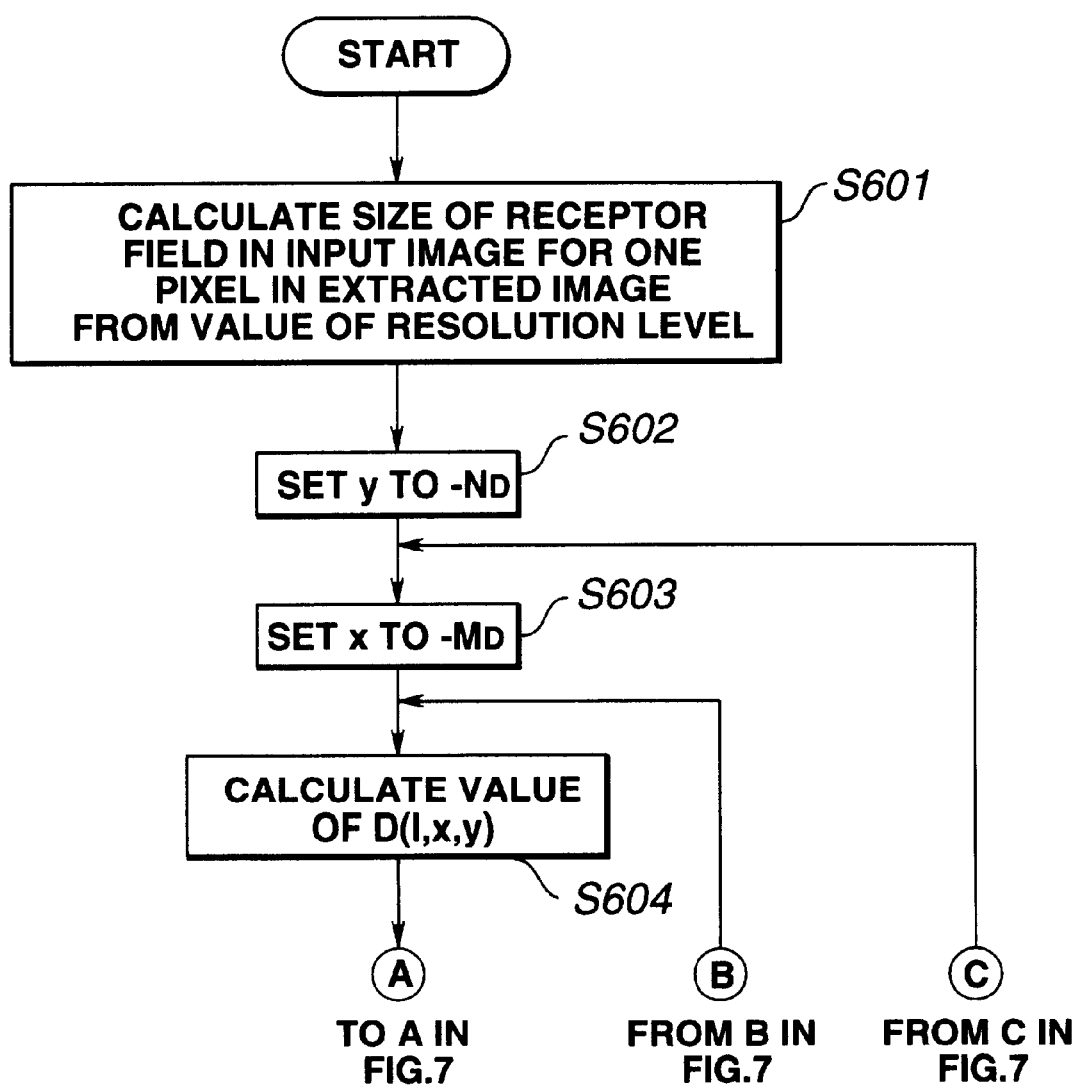
FIGS. 6 and 7 are flowcharts illustrating processing of extracting an image at a resolution level l.
Figure 7:
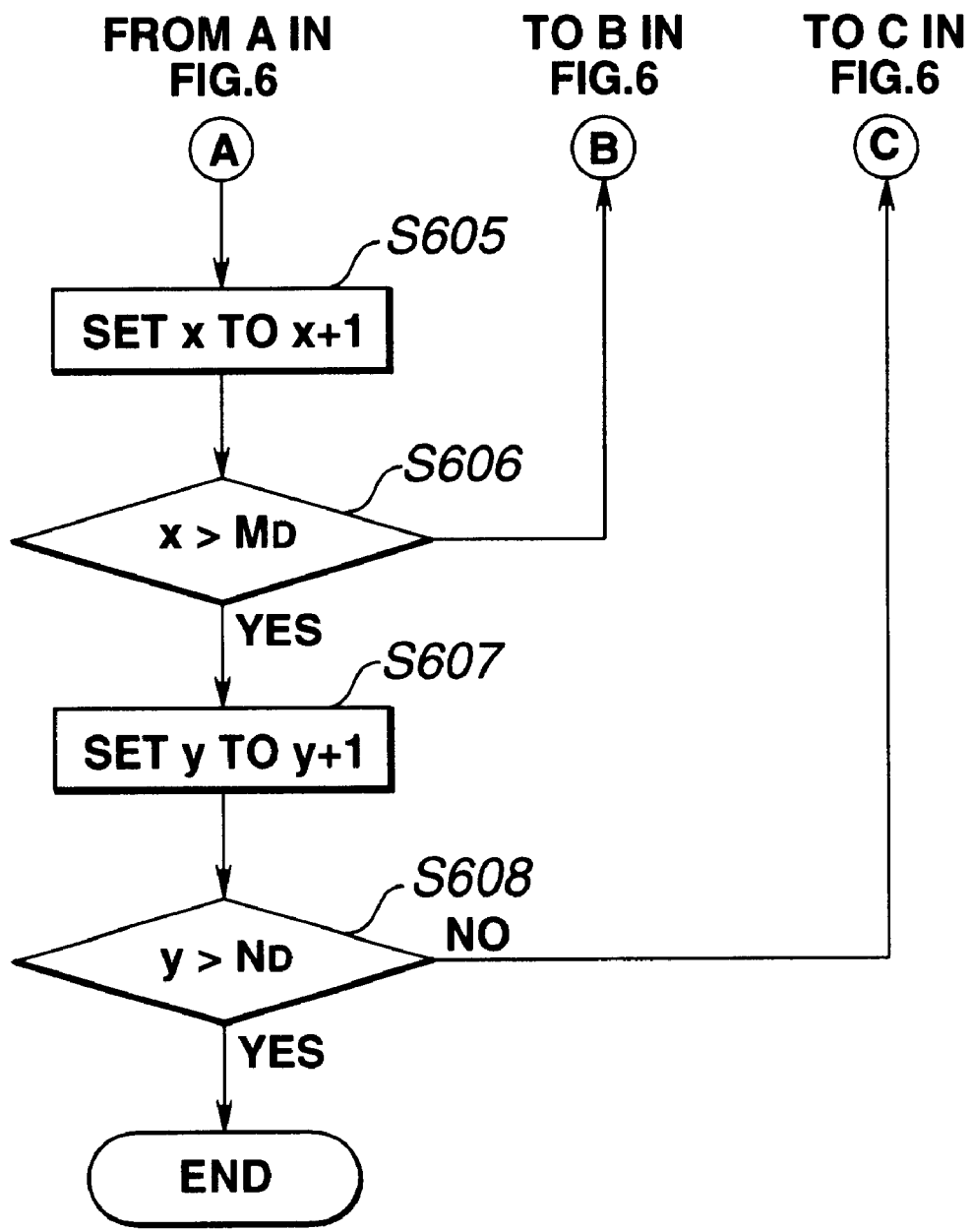

Next, a description will be provided of the processing executed in step S303 with reference to FIGS. 5 through 7.

First, in step S501, l is set to 0. Then, in step S502, an image at resolution level l at the target point g=(gx,gy):

$D(l,m,n), -M_D \leq m \leq M_D, -N_D \leq n \leq N_D$ is extracted from the input image. This processing will be described later with reference to FIGS. 6 and 7.

In step S503, l is updated to l+1. In step S504, it is determined if l is greater than or equal to L. If the result of the determination is affirmative, the process is terminated. If the result of the determination is negative, the process returns to step S502.

According to the above-described processing, images at resolution levels l through L at the gaze point are extracted from the input image.

Next, a description will be provided of the processing of extracting an image at resolution level l at the target point from the input image, executed in step S502, with reference to FIGS. 6 and 7.

In step S601, the size of a receptor field in the input image I for one pixel D(l,m,n) of the extracted image is calculated from the value of the resolution level. The receptor field is the range of pixels of the input image utilized for calculating the value of one pixel of the extracted image. In the first embodiment, a square lattice comprising $3^l$ pixels in the vertical and horizontal directions is used. That is, when level l=0, the lattice comprises one pixel in the vertical and horizontal directions, and when level l=1, the lattice comprises 3 pixels in the vertical and horizontal directions. The range of the receptor field will be hereinafter described as from $-\Delta x$ to $\Delta x$, and from $-\Delta y$ to $\Delta y$.

In step S602, y is set to $-N_D$. In step S603, x is set to $-M_D$.

In step S604, the value of one pixel at level 1 and having a two-dimensional lattice position of (x,y) of the extracted image is calculated according to the following equation:

$$D(l, x, y) = \sum_{dy=-\Delta y}^{dy=\Delta y} \sum_{dx=-\Delta x}^{dx=\Delta x} \theta(dx, dy) I(gx + x + dx, gy + y + dy). \quad (20)$$

This equation is an equation for calculating a weighted mean value over the receptor field.

In step S605, x is updated to x+1. In step S606, it is determined if x exceeds $M_D$. If the result of the determination is affirmative, the process proceeds to step S607. If the result of the determination is negative, the process returns to step S604.

In step S607, y is updated to y+1. In step S608, it is determined if y exceeds $N_D$. If the result of the determination in step S608 is affirmative, the process is terminated. If the result of the determination in step S608 is negative, the process returns to step S603.

A description will now be provided of the processing of updating the probability distribution in step S306 with reference to the flowcharts shown in FIGS. 10 through 12, and FIG. 13.

Figure 13:
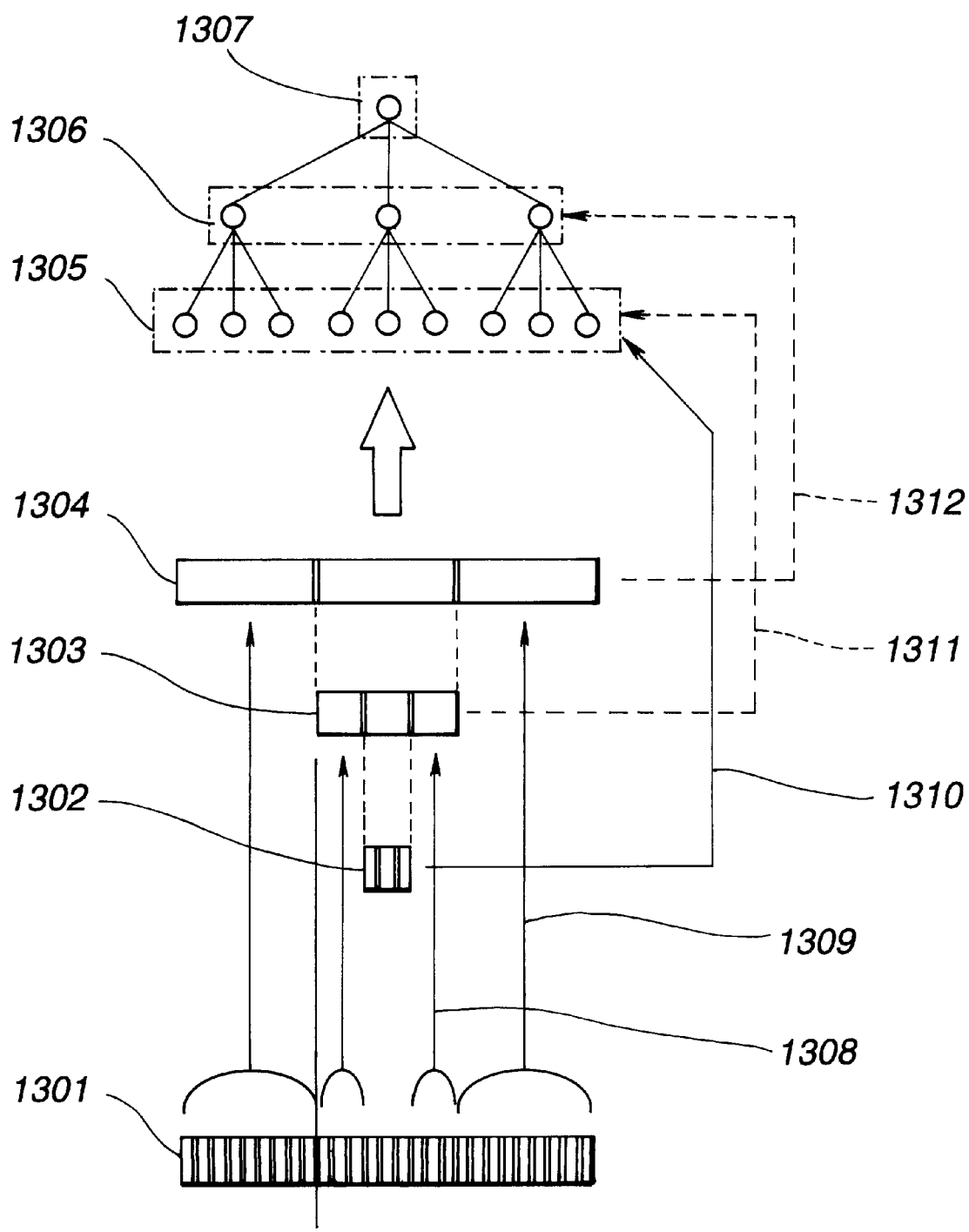
FIG. 13 is a diagram illustrating processing of updating a probality distribution.

In FIG. 13, reference numeral 1301 represents an input image I, reference numerals 1302 through 1304 represent a multiresolution image D, and reference numerals 1305 through 1307 represent a probabilistic cellular automaton A. For the purpose of simplification, FIG. 13 is one dimensionally illustrated. The multiple-resolution image D comprises 9 pixels in total, i.e., 3 pixels having resolution levels of 0, 1, and 2 in the vertical and horizontal directions.

The probabilistic cell automaton A has three hierarchical levels 1, 2 and 3, and includes 9 pixels in total, i.e., 3 pixels at each hierarchical level in the vertical and horizontal directions. The multiple-resolution image D is extracted around the target point from the input image. The value of 9 pixels at resolution level 0 corresponds to that of the input image. The values of 9 pixels at resolution level 1 are obtained by performing integral transform of 9 pixels in total, i.e., 3 pixels in the vertical and horizontal directions, of the input image using an appropriate integral kernel 1304, for example, 905 shown in FIG. 9. Similarly, the values of 9 pixels at resolution level 2 are obtained by performing integral transform of 81 pixels in total, i.e., 9 pixels in the vertical and horizontal directions, of the input image using an appropriate integral kernel, for example, 904 shown in FIG. 9.

Figure 10:
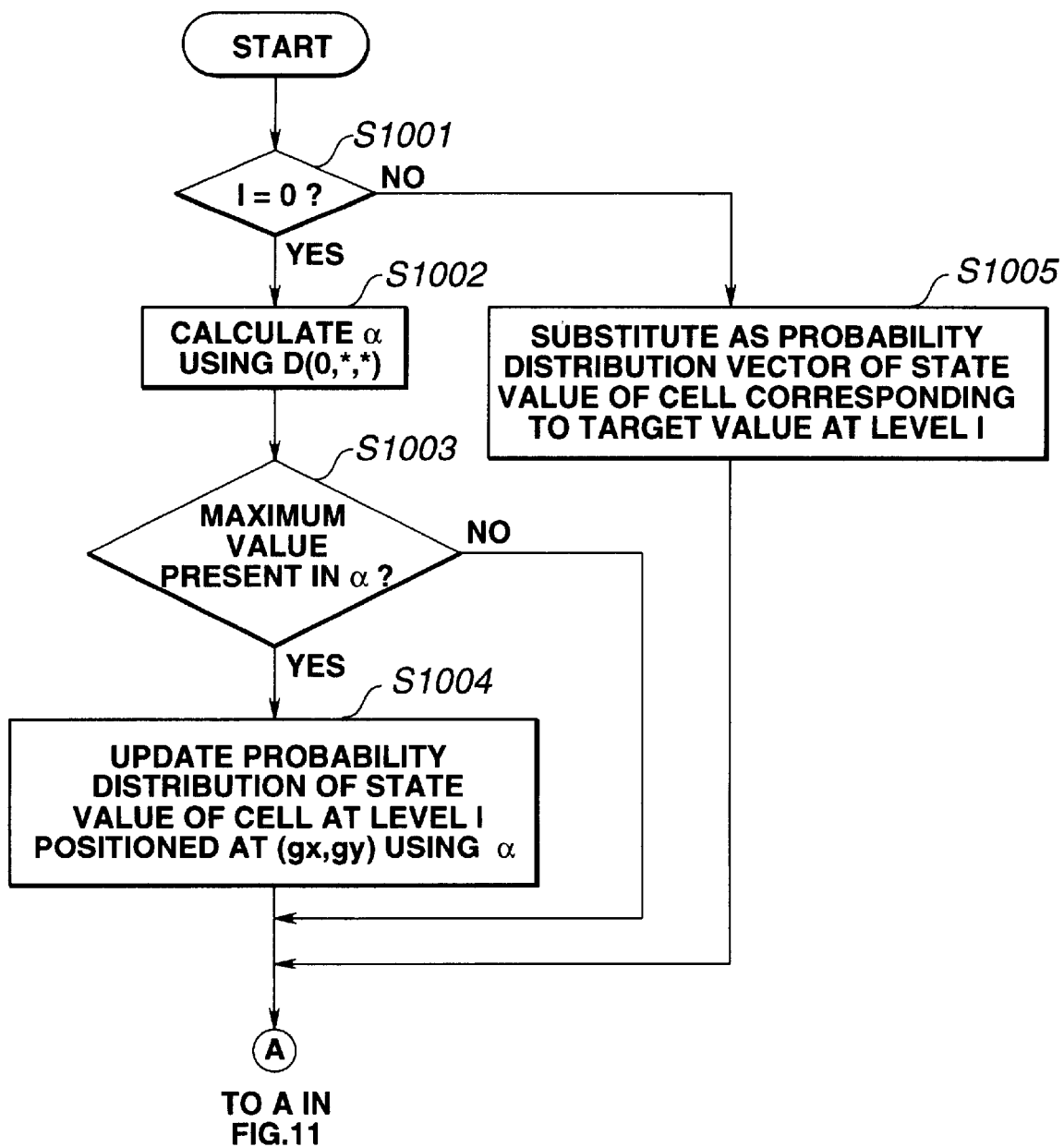
FIGS. 10 through 12 are flowcharts illustrating processing of updating a probability distribution.

Next, a description will be provided of procedures of processing of updating the probability distribution with reference to FIG. 10.

First, in step S1001, it is determined if the hierarchical level l is 0. If the result of the determination is affirmative, the process proceeds to step S1002. If the result of the determination is negative, the process proceeds to step S1005.

In step S1002, the value α is calculated according to the following equation using the image D(0,*,*) 1302 at resolution level 0 and first correspondence 1310:

$$\alpha = \lambda((\alpha_1, \alpha_2, \ldots, \alpha_w)^T). \quad (21)$$

When the first correspondence 1310 is a code book for vector quantization, the inner product of the input image D(0,*,*) and a representative vector stored in the code book, and the value of the inner product for a code word j is represented as $\alpha_j$.

In step S1003, it is determined if a maximum value is present in elements of α. If the result of the determination in step S1003 is affirmative, the process proceeds to step S1004. If the result of the determination in step S1003 is negative, the process proceeds to step S1006.

In step S1004, the probability distribution of the state value of the probabilistic cellular automaton is updated according to the following equation:

$$A(l, gx_1, gy_1, kmax) = 1, \quad (22)$$

$$A(l, gx_1, gy_1, k) = 0, \ k \neq kmax, \quad (23)$$

where kmax is an element having a maximum value from among elements of α.

In step S1005, the value of the probability distribution vector β (to be described later) is substituted as the probability distribution of the state value of the cell corresponding to the target value at hierarchical level l:

$$A(l, gx_1, gy_1, *) = \beta. \quad (24)$$

In step S1006, m is set to $-M_D$. In step S1007, n is set to $-N_D$.

In step S1008, the conditional probability distribution vector dP for the value of the multiple-resolution image $D(l, gx_1+m, gy_1+n)$ is calculated according to the following equation:

$$dP = (dP_1, dP_2, \ldots, dP_w)^T. \quad (25)$$

When $D(l, gx_1+m, gy_1+n)$ has discrete values $\{1, 2, \ldots, N\}$, the above-described equation can be rewritten as follows using a transformation matrix F:

$$dP = \begin{pmatrix} f(1,1) & f(1,2) & \cdots & f(1,N) \\ f(2,1) & f(2,2) & \cdots & f(2,N) \\ \cdots & \cdots & \cdots & \cdots \\ f(W,1) & f(W,2) & \cdots & f(W,N) \end{pmatrix} \begin{pmatrix} Pr(D(l, gx_1+m, gy_1+n)=1) \\ Pr(D(l, gx_1+m, gy_1+n)=2) \\ \cdots \\ Pr(D(l, gx_1+m, gy_1+n)=N) \end{pmatrix},$$

where $Pr(l, gx_1+m, gy_1+n)=N$) is the probability that $D(l, gx_1+m, gy_1+n)$ is N. Accordingly, when $D(l, gx_1+m, gy_1+n)$ is 2, dP is $(f(1,2), f(2,2), \ldots, f(W,2))^T$.

In step S1009, the probability distribution vector of the cell is corrected as follows using the above-described dP:

$$A_{NEW}(i, gx_1 + mgy_1 + n, *) = \quad (26)$$
$$\lambda((A_{NEW}(1), A_{NEW}(2), \cdots, A_{NEW}(W))^T,$$
$$A_{NEW}(j) = A_{OLD}(l, gx_1 + m, gy_1 + n, j) dP_j, \ \forall j \in \{1, 2, \cdots, W\}.$$

In step S1010, n is updated to n+1. In step S1011, it is determined if n exceeds $N_D$. If the result of the determination is affirmative, the process proceeds to step S1012. If the result of the determination is negative, the process proceeds to step S1008.

In step S1012, m is updated to m+1. In step S1013, it is determined if m exceeds $M_D$. If the result of the determination in step S1013 is affirmative, the process is terminated. If the result of the determination in step S1013 is negative, the process returns to step S1007.

Figure 4:
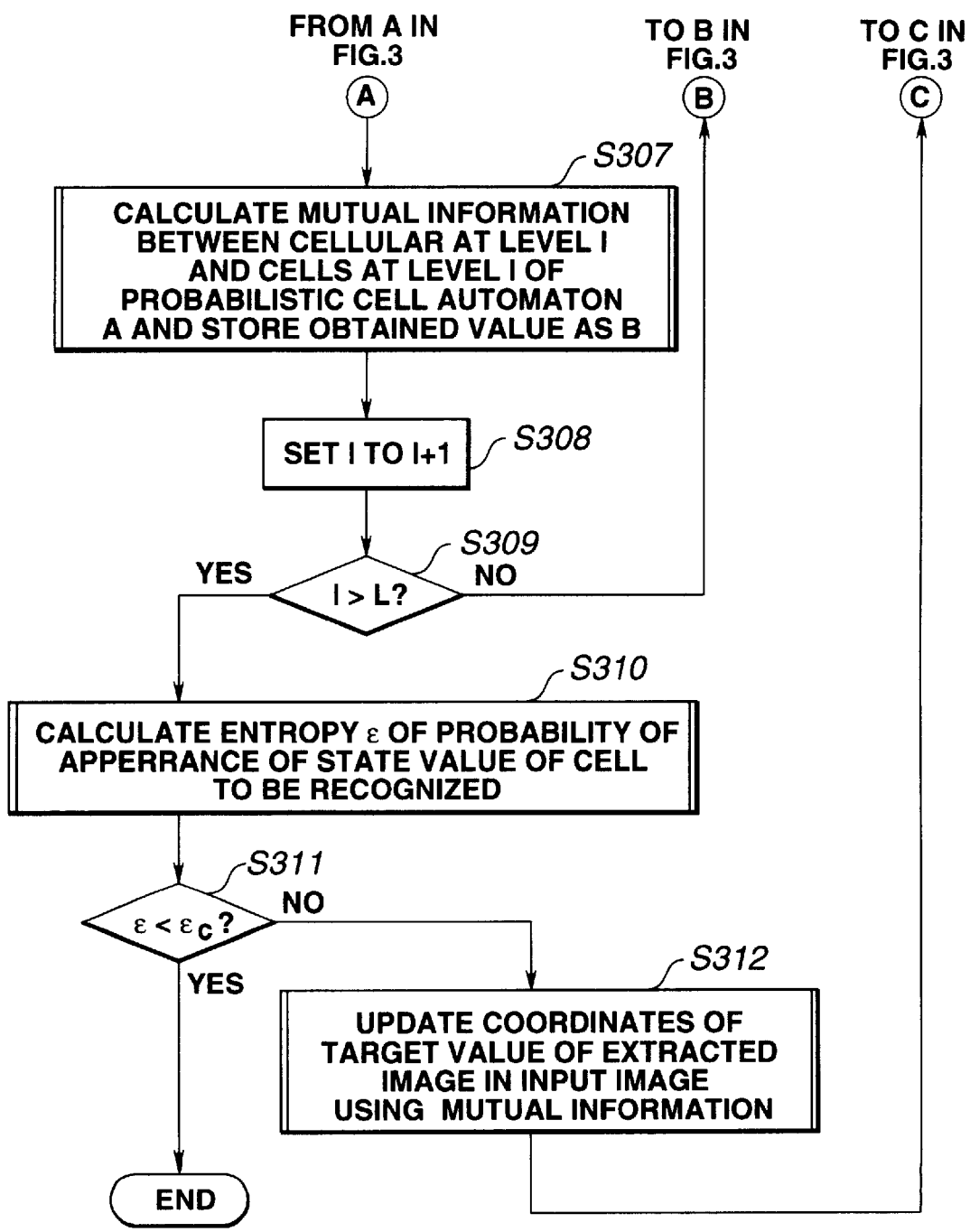
Figure 14:
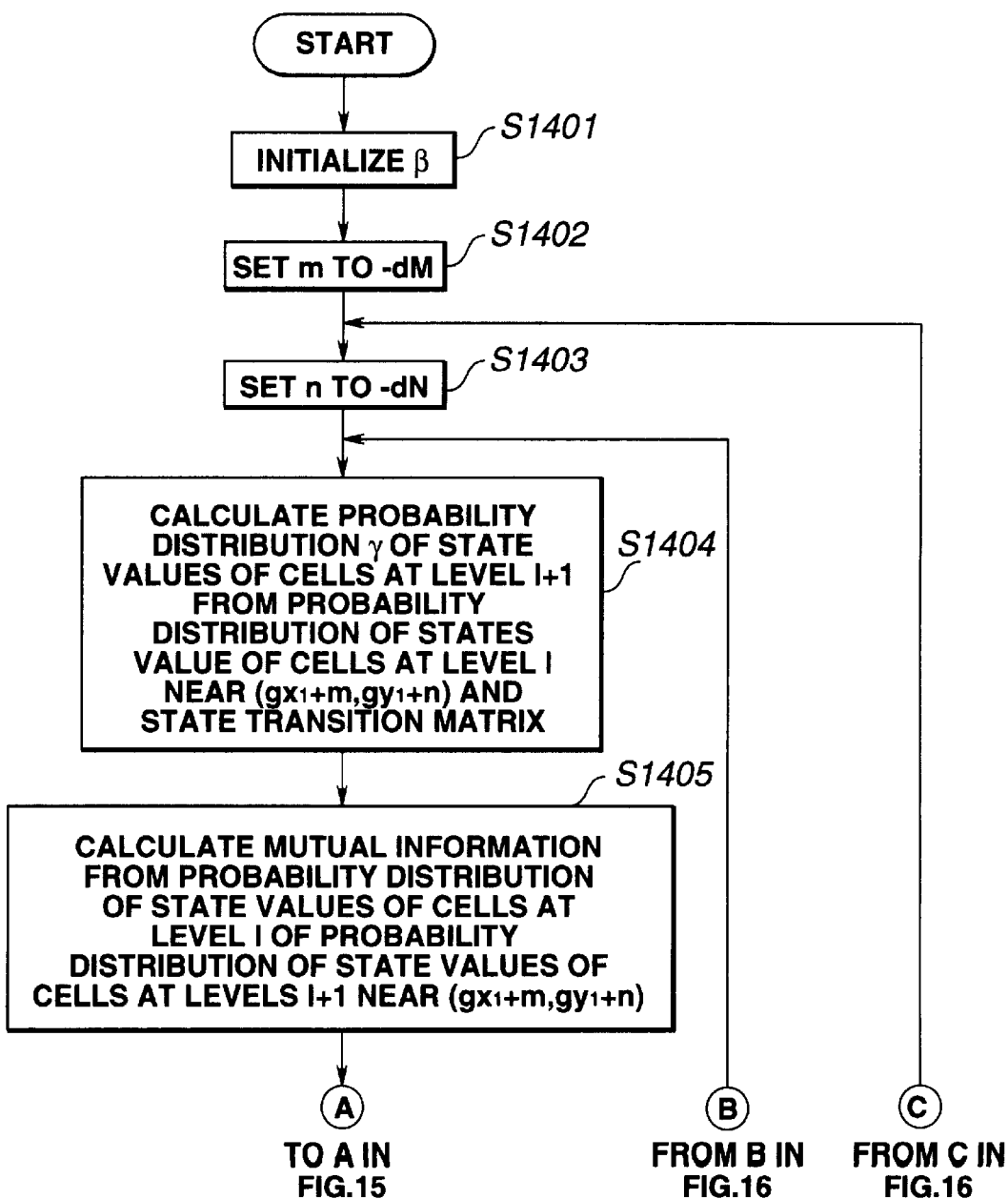
FIGS. 14 through 16 are diagrams illustrating processing of calculating mutual information.
Figure 15:
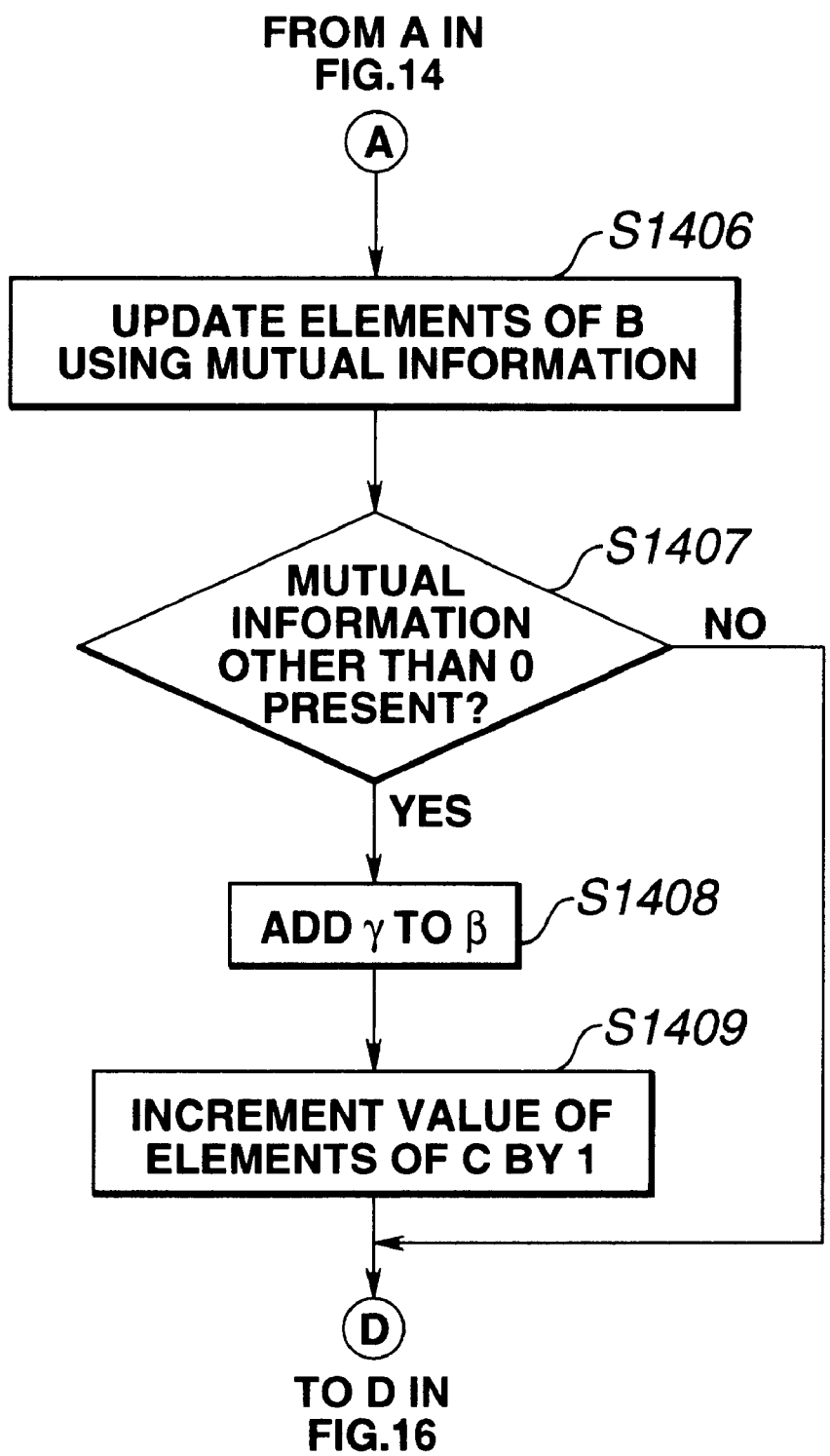
Figure 16:
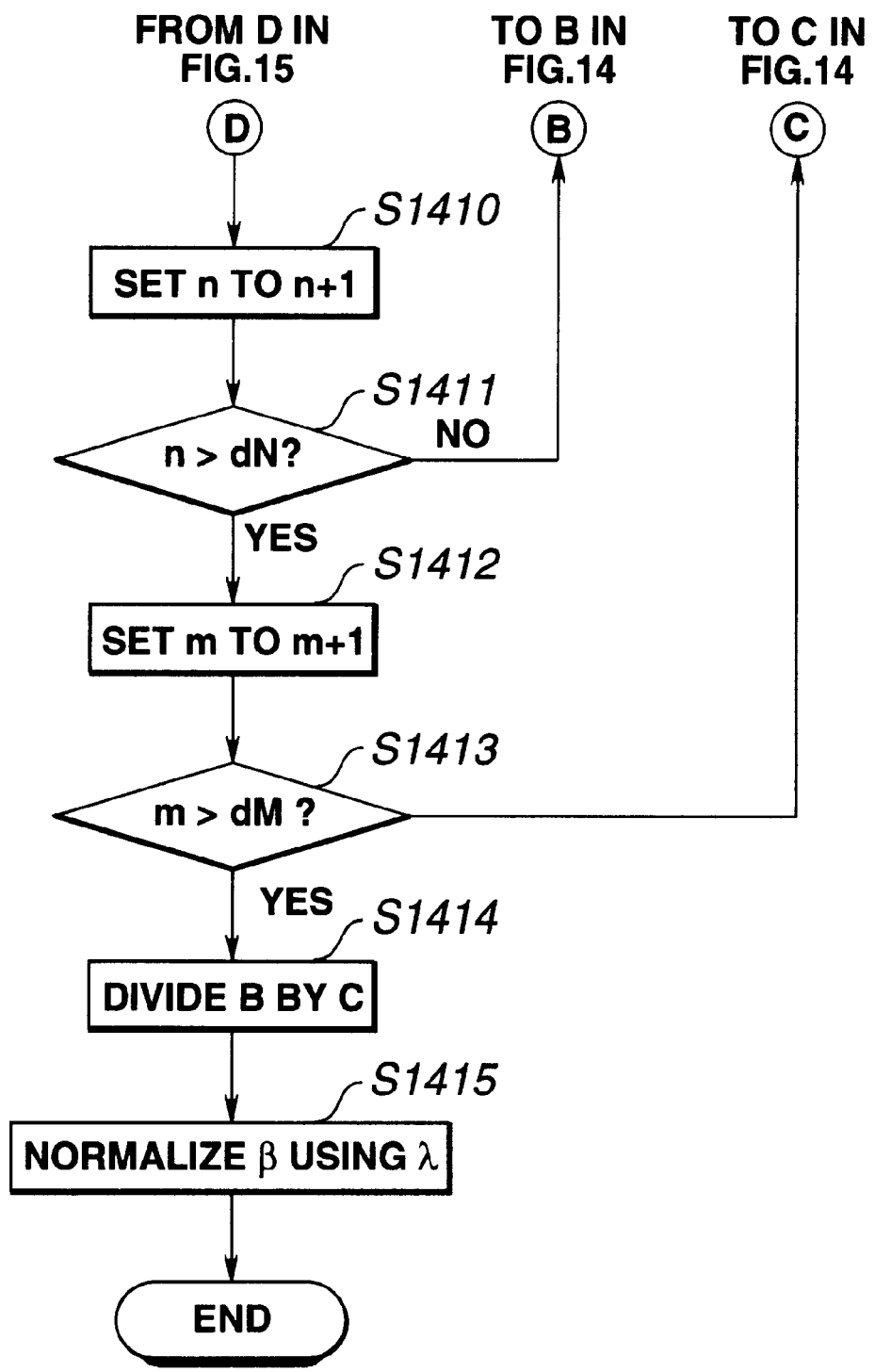
Figure 17:
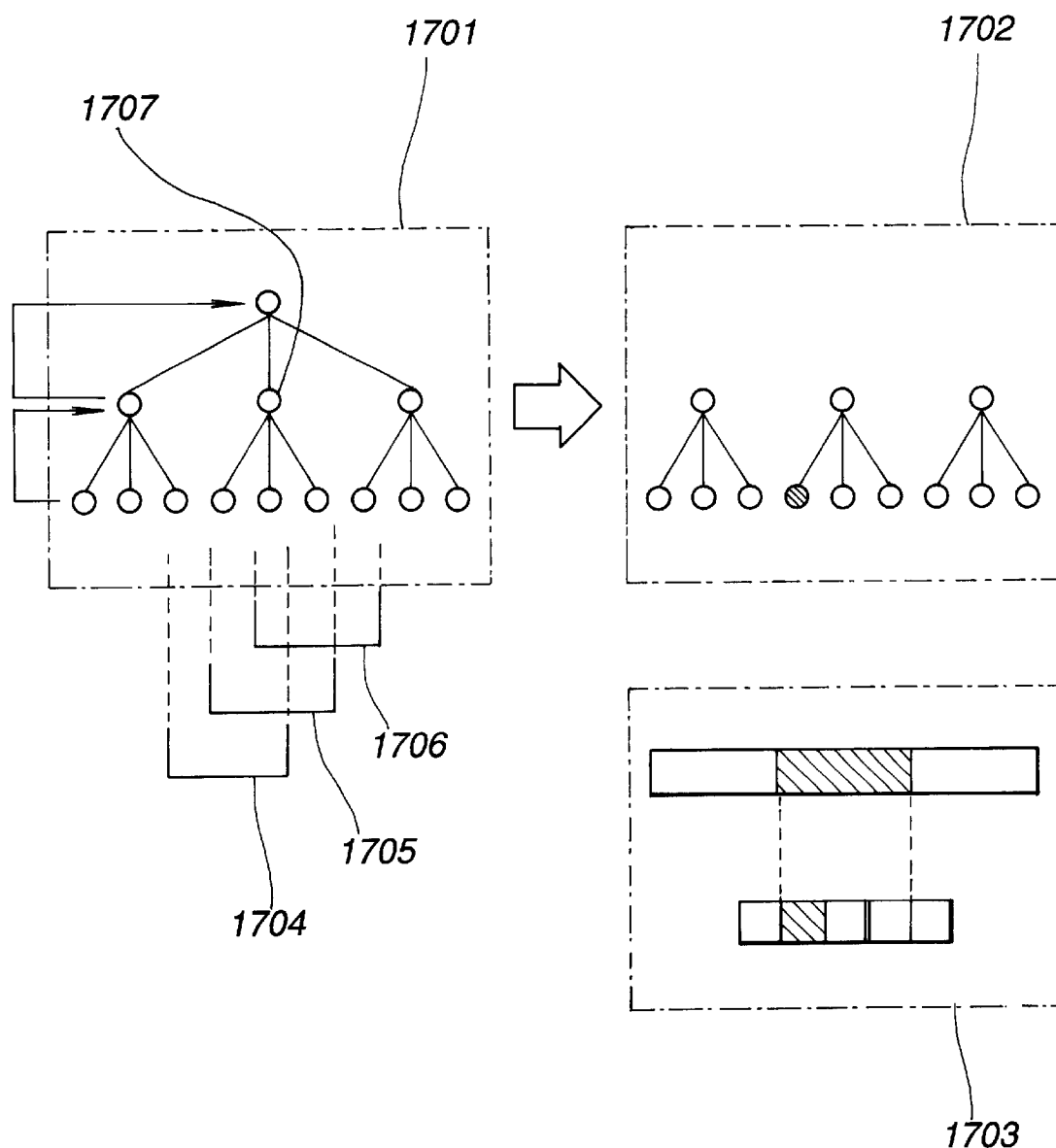
FIG. 17 is a diagram illustrating relationship among data in processing of calculating mutual information.

Next, a description will be provided of the processing of calculating mutual information executed in step S307 shown in FIG. 4 with reference to the flowcharts shown in FIGS. 14 through 16. FIG. 17 illustrates the relationship between respective data in this processing.

First, in step S1401, the probability distribution vector β is initialized to a zero vector. This probability distribution vector β represents, for example in FIG. 17, the probability distribution of the state value of a cell 1707 at hierarchical level 2 for a cell 1705 at hierarchical level 1 of the probabilistic cell automaton.

In step S1402, m is initialized to −dM, where dM=$M_B$−$M_D$. Then, in step S1403, n is initialized to −dN, where dN=$N_B$−$N_D$.

The above-described operations for m and n are considered for performing parallel movement by a cell of the set of cells at hierarchical level 1 constituting cells 1707 shown in FIG. 17 in the vertical and horizontal directions around the current target point, as represented by reference numerals 1704, 1705 and 1707.

In step S1404, the probability distribution gamma of state values is calculated using the probability distribution vector A(l,j,k,*) of cells at the following positions in the cell space, i.e., cells represented by reference numeral 1704, 1705 or 1706 in FIG. 17, i.e., cells belonging to the following neighborhood system X(l+1,$gx_1$+m,$gy_1$+n):

$$X(l+1, gx_1+m, gy_1+n) = \qquad (27)$$
$$\{(l, gx_1+m-1, gy_1+n-1), (l, gx_1+m-1, gy_1+n),$$
$$(l, gx_1+m-1, gy_1+n+1), (l, gx_1+m, gy_1+n-1),$$
$$(l, gx_1+m, gy_1+n), (l, gx_1+m, gy_1+n+1),$$
$$(l, gx_1+m+1, gy_1+n-1), (l, gx_1+m+1, gy_1+n),$$
$$(l, gx_1+m+1, gy_1+n+1)\}.$$

W-dimensional vector γ=λ(γ(1|w),γ(2|w), . . . , γ(W|w))$^T$ having elements γ(v|w) calculated according to the following equation is calculated:

$$\gamma(v\mid w) = \prod_{(l,j',k')\in\{X(l+1,m,n)-(l,j,k)\}} \langle\psi(l+1, gx_1+m, gy_1+n,v|l, j', k'{,}^*)|A(l, j', k'{,}^*)\rangle \times \qquad (28)$$
$$\psi(l+1, gx_1+m, gy_1+n, v \mid l, j, k, w),$$

where w is one of state values of a cell (l,j,k), and products at the right side are calculated over cells other than the cell (l,j,k) from among cells belonging to the neighborhood system X(l+1,$gx_1$+m,$gy_1$+n).

In step S1405, mutual information (l,j,k) between a cell (l+1,$gx_1$+m,$gy_1$+n) and a cell (l,j,k) belonging to its neighborhood system X(l+1,$gx_1$+m,$gy_1$+n) is calculated according to the following equation:

$$\sigma(l, j, k) = -\sum_w A(l, j, k, w)\sum_v \gamma(v\mid w)\log\{\psi(l+1, gx_1+m, gy_1+n, v \mid l, j, k, w)\} + \qquad (29)$$
$$\sum_w A(l, j, k, w)$$
$$\sum_v \gamma(v\mid w)\log\langle\psi(l+1, gx_1+m, gy_1+n,^* \mid l, j, k,^*\Big|A(l, j, k,^*)\rangle\Big\}.$$

In step S1406, B is updated using the above-described mutual information:

$$B(l,j,k)=B(l,j,k)+\sigma(l,j,k). \qquad (30)$$

In step S1407, it is determined if mutual information other than zero is present in the above-described mutual information σ(l,j,k),(l,j,k)∈X(l+1,$gx_1$+m,$gy_1$+n) calcuated according to equation (30). If the result of the determination is affirmative, the process proceeds to step S1408. If the result of the determination is negative, the process proceeds to step S1410.

In step S1408, β is updated using γ:

$$\beta=\beta+\gamma. \qquad (31)$$

In step S1409, the value of C is updated:

$$C(l,j,k)=C(l,j,k)+1, (l,j,k)\in X(l+1,m,n). \qquad (32)$$

In step S1410, n is updated to n+1. In step S1411, it is determined if n exceeds dN. If the result of the determination in step S1411 is affirmative, the process proceeds to step S1412. If the result of the determination in step S1411 is negative, the process returns to step S1404.

In step S1412, m is updated to m+1. In step S1413, it is determined if m exceeds dM. If the result of the determination in step S1413 is affirmative, the process proceeds to step S1414. If the result of the determination in step S1413 is negative, the process returns to step S1403.

In step S1414, multiple-resolution data B is updated using multiple-resolution data C:

$$B(l,m,n)=B(l,m,n)/C(l,m,n), \text{ if } C(l,m,n)\approx 0, \forall m\in[-M_B,M_B]\subset Z, \forall n\in [-N_B,N_B]\subset Z. \qquad (33)$$

In step S1415, the probability distribution vector β is normalized using a function λ.

Figure 18:
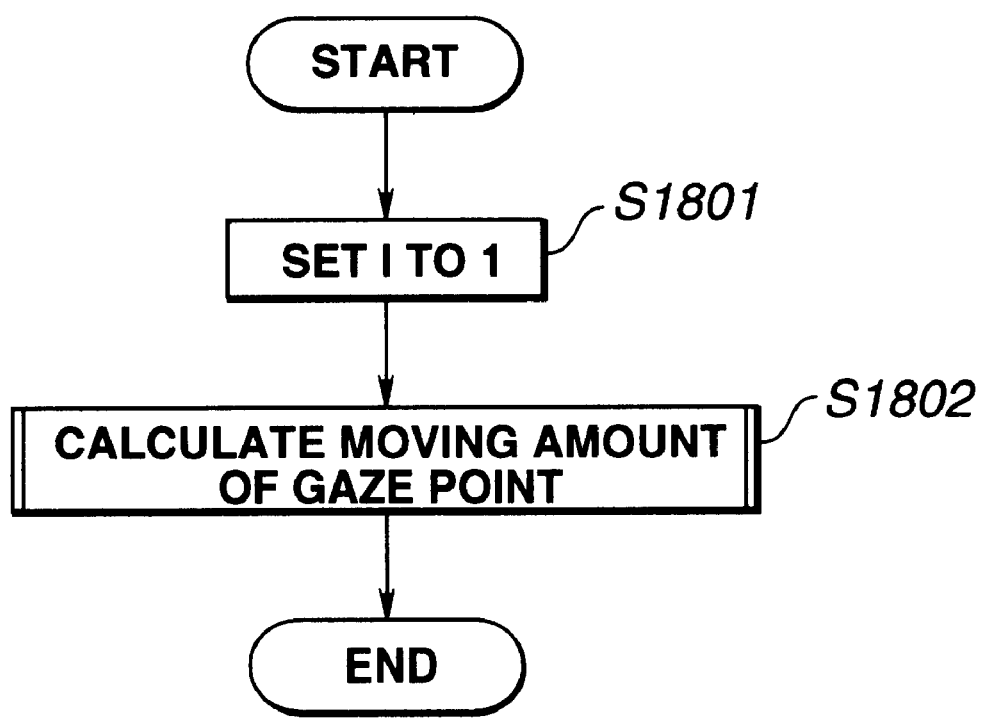
FIG. 18 is a flowchart illustrating processing of updating the coordinates of a target point.

Next, a description will be provided of the processing of updating the coordinates of the target point executed in step S311 with reference to FIG. 18.

Figure 19:
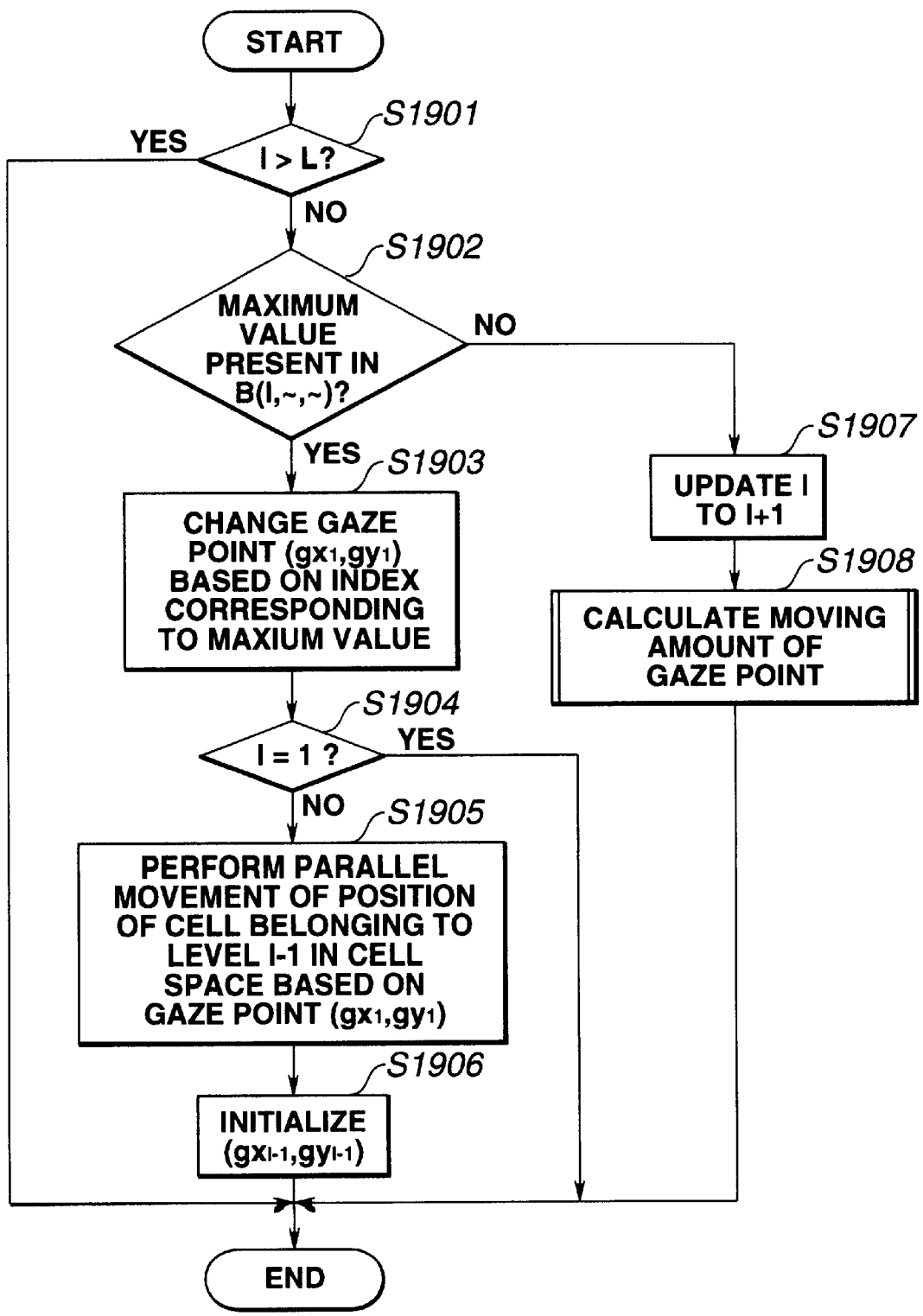
FIG. 19 is a flowchart illustrating processing of calculating movement of a target point.

First, in step S1801, l is set to 1. In step S1802, the amount of movement of the target point is calculated. This processing will be described with reference to the flowchart shown in FIG. 19.

In step S1901, it is determined if l exceeds L. If the result of the determination is affirmative, the process is terminated. If the result of the determination is negative, the process proceeds to step S1902.

In step S1902, it is determined if an element other than zero having a maximum value is present in B(l,∼,∼). If the result of the determination in step S1902 is affirmative, the process proceeds to step S1903. If the result of the determination in step S1902 is negative, the process proceeds to step S1907.

In step S1903, the position of the target point is changed based on the index corresponding to the maximum value. If two indices corresponding to the two-dimensional space of the element having the maximum value are represented by mmax and nmax, only elements corresponding to level 1 in the position of the target point described in ternary numbers according to equation (17) are changed:

$$gx_1=gx_1+\text{mmax}, gy_1=gy_1+\text{nmax}. \tag{34}$$

In step S1904, it is determined if l is 1. If the result of the determination is negative, the process proceeds to step S1905. If the result of the determination is affirmative, the process is terminated.

In step S1905, the positions of cells of the probabilistic cell automaton belonging to hierarchical level l−1 in the cell space are subjected to parallel movement. That is, $$A(l,m,n,*)=A(l,m-\text{mmax},n-\text{nmax}),*). \tag{35}$$

In step S1906, $(gx_1-1, gy_1-1)$ is reset to (0,0). In step S1907 which is executed when the result of the determination in step S1902 is negative, l is updated to l+1. In step S1908, the calculation of the amount of movement of the target point in step S1802 shown in FIG. 18 is executed. As described above, the processing of FIG. 19 is recursive.

An example of realizing the above-described recognition processing using software will now be described with reference to FIGS. 28 through 41. This software is written with an advanced language called MATLAB.

Figure 41:
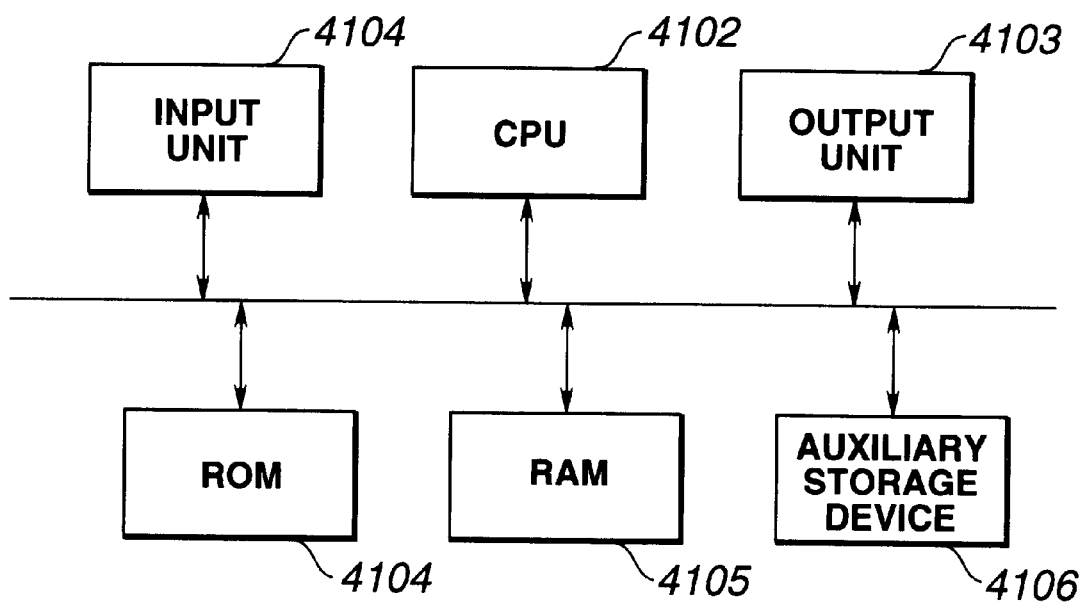
FIG. 41 is a diagram illustrating an example of the configuration of hardware.

FIG. 41 is a diagram illustrating an example of the configuration of hardware for executing this software.

In FIG. 41, an input unit 4101 includes an interface for receiving an image signal to be recognized from the outside, and a keyboard and a mouse for allowing input of commands and the like by the user. A CPU 4102 controls respective units of the apparatus and executes processing of programs. An output unit 4103 displays or prints a result of recognition, and transmits the result of recognition or control signals to an external apparatus.

A ROM 4104 stores fixed data and programs. A RAM (random access memory) 4105 includes work areas for storing data necessary for recognition processing, such as multiple-resolution image data, the probability distribution of the state values of cells of a probabilistic cell automaton, a quantization code book, and the like, as well as program areas for storing programs loaded from an auxiliary storage device 4106. The auxiliary storage device 4106 stores programs and data using storage media, such as floppy disks, hard disks or the like.

FIGS. 28 through 36 illustrate a main program called saccade6(.), which has the function of recognizing a given two-dimensional digital image. The structure of a probabilistic cellular automaton is provided in advance. The structure of the cell space is shown in FIG. 8, and multiple-resolution partial images are shown in FIG. 9.

FIG. 20 illustrates code books and a correspondence table between the state values of cells. In FIG. 20, numerals in each pattern comprising 3×3 blocks represent a respresentative vector, or the spatial distribution of the state values of cells, and a numeral under each pattern represents a code word corresponding to the representative vector, or the state value of the corresponding cell.

A code book 1310 shown in FIG. 13 corresponds to patterns comprising 3×3 pixels where numerals between 2 and 9 are allocated in FIG. 20. Mapping 1707 between cells shown in FIG. 17 corresponds to patterns where numerals between 10 and 15 are allocated in FIG. 20.

Figure 22:
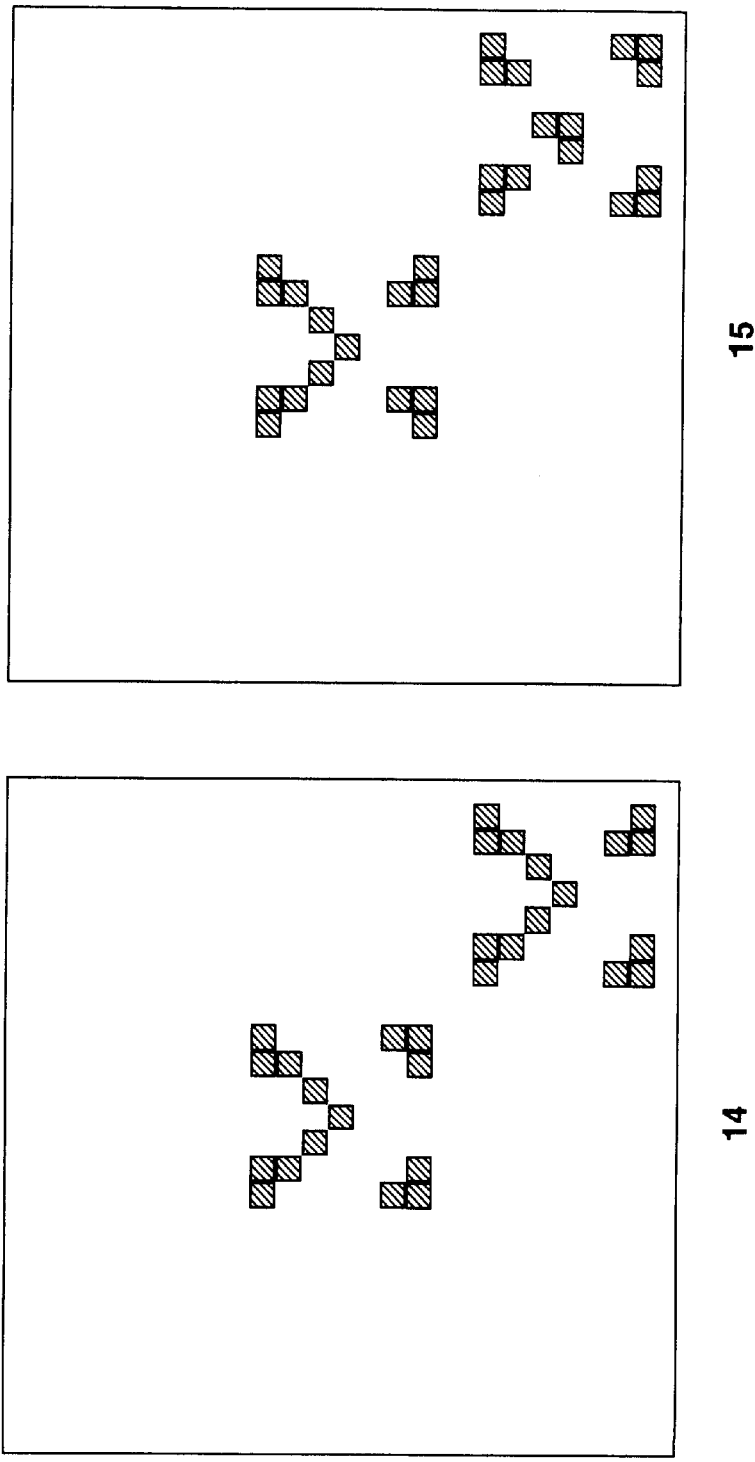

FIG. 21 shows state vectors where numerals between 10 and 13 are allocated as two-dimensional images. Similarly, FIG. 22 shows state vectors where numerals 14 and 15 are allocated as two-dimensional images.

FIGS. 37 and 38 illustrate a subroutine mutinf(.) called in saccade6(.). The mutinf(.) is a program for calculating mutual information.

Programs extract2(.) shown in FIG. 39 and subsampl(.) shown in FIG. 40 are subroutines for extracting a multiresolution partial image from an input image.

Figure 23:
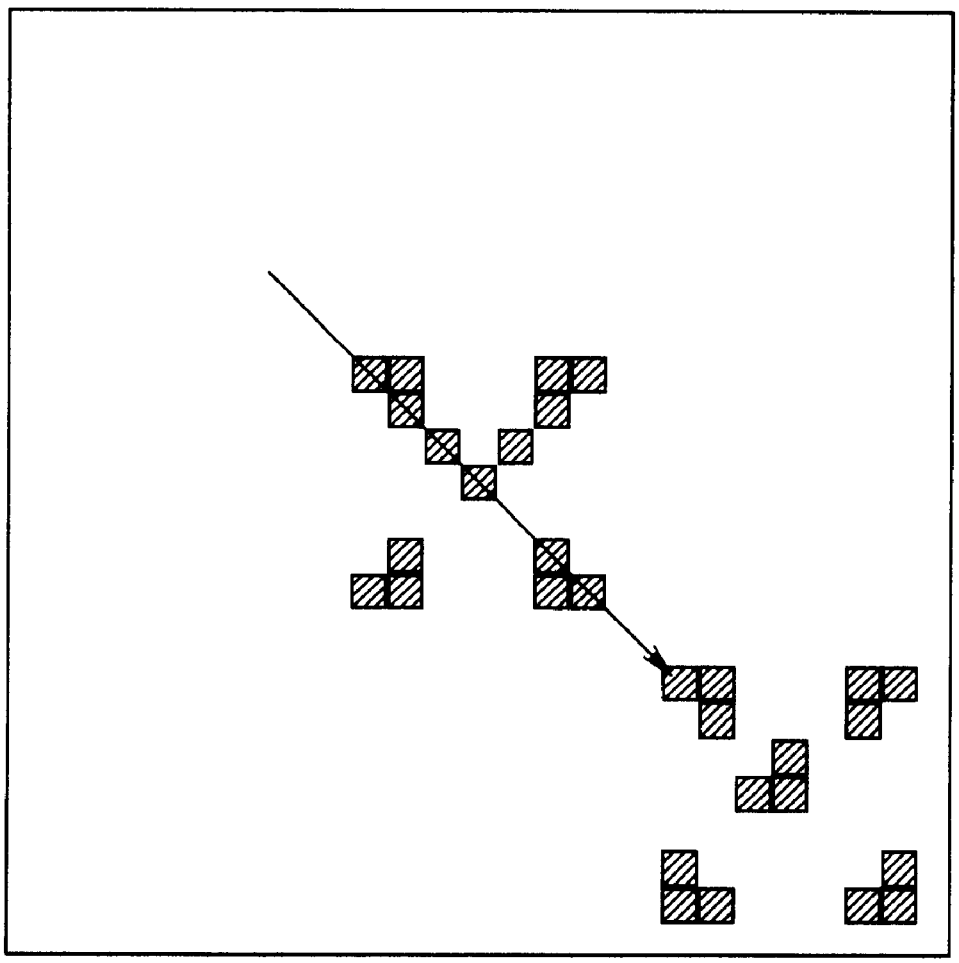
FIG. 23 is a diagram illustrating movement of a target point.

If saccade6(.) is executed by making state vector 15 shown in FIG. 15 to be an input image, making the coordinates of a pixel at the upper left of the image to be (1,1), providing the vertical and horizontal coordinate systems in the downward and rightward directions, respectively, and initializing the target point at (2,2), the position of the gaze point moves from (2,2) to (20,20) and stops, as shown in FIG. 23.

The probabilities Pr(14) and Pr(15) for state values 14 and 15, respectively, for these target points are Pr(14)=0.5 and Pr(15)=0.5 when the target point is at (2,2), and Pr(14)= 0.0058 and Pr(15)=0.0042 when the target point moves to (20,20). Thus, recognition is completed at a single operation of moving the gaze point.

If a method based on only features of an image is used instead of the gaze-point moving method of the first embodiment, at least 10 gaze-point moving operations are required.

Figure 24:
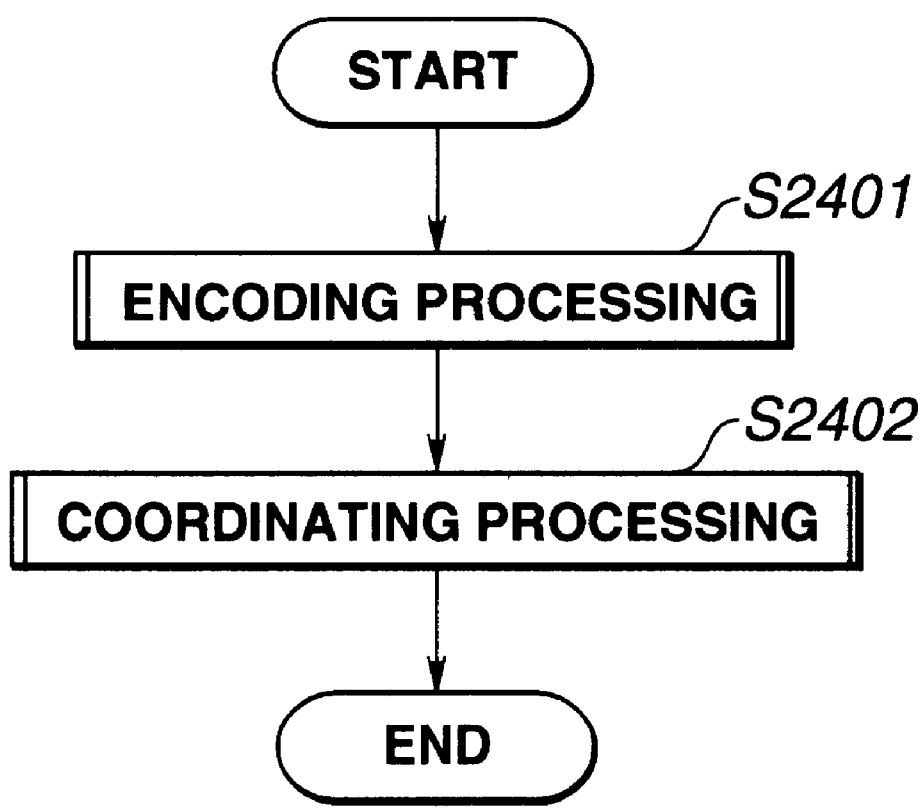
FIG. 24 is a flowchart illustrating learning of a code book and mapping between cells.
Figure 25:
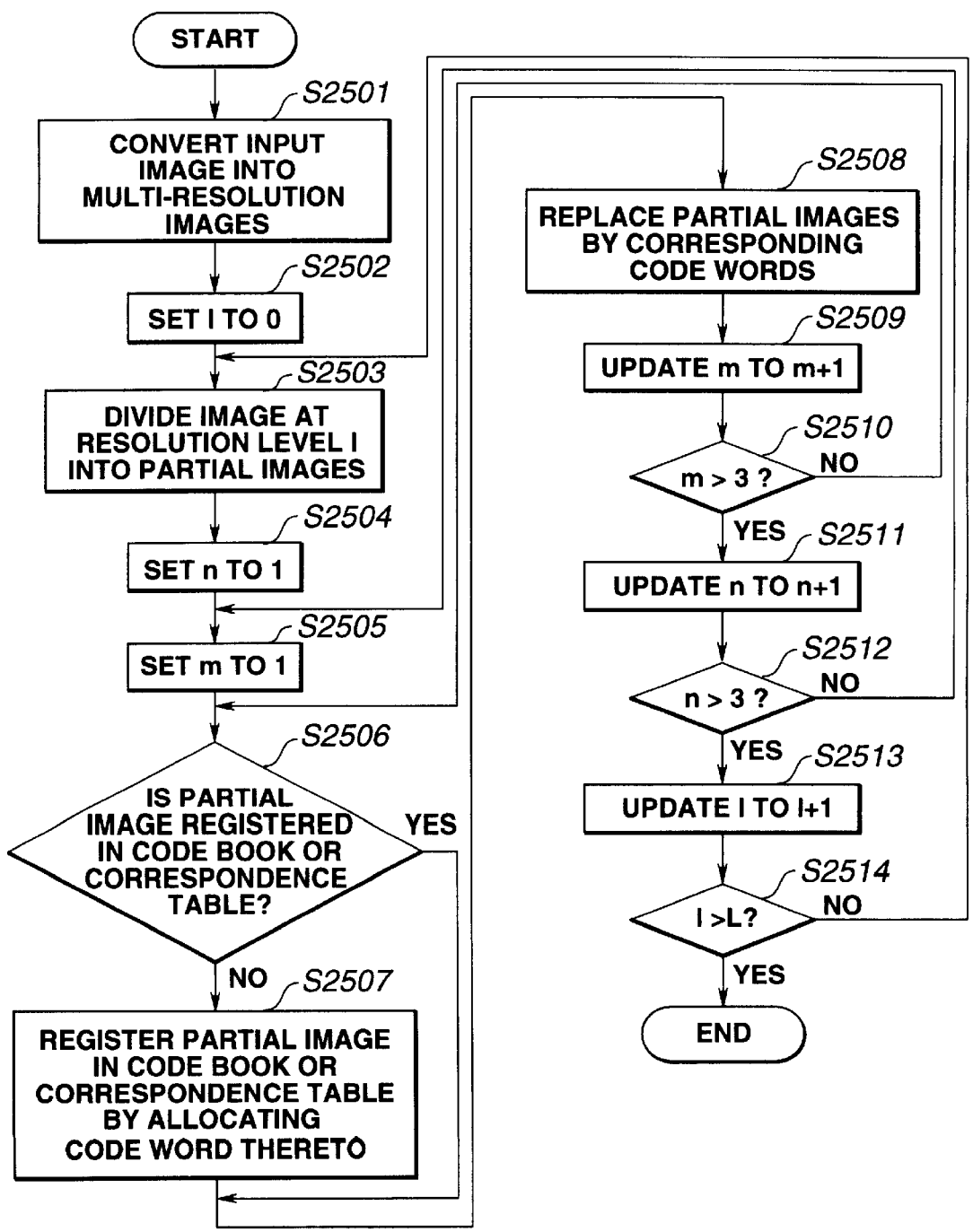
FIG. 25 is a flowchart illustrating encoding processing.
Figure 26:
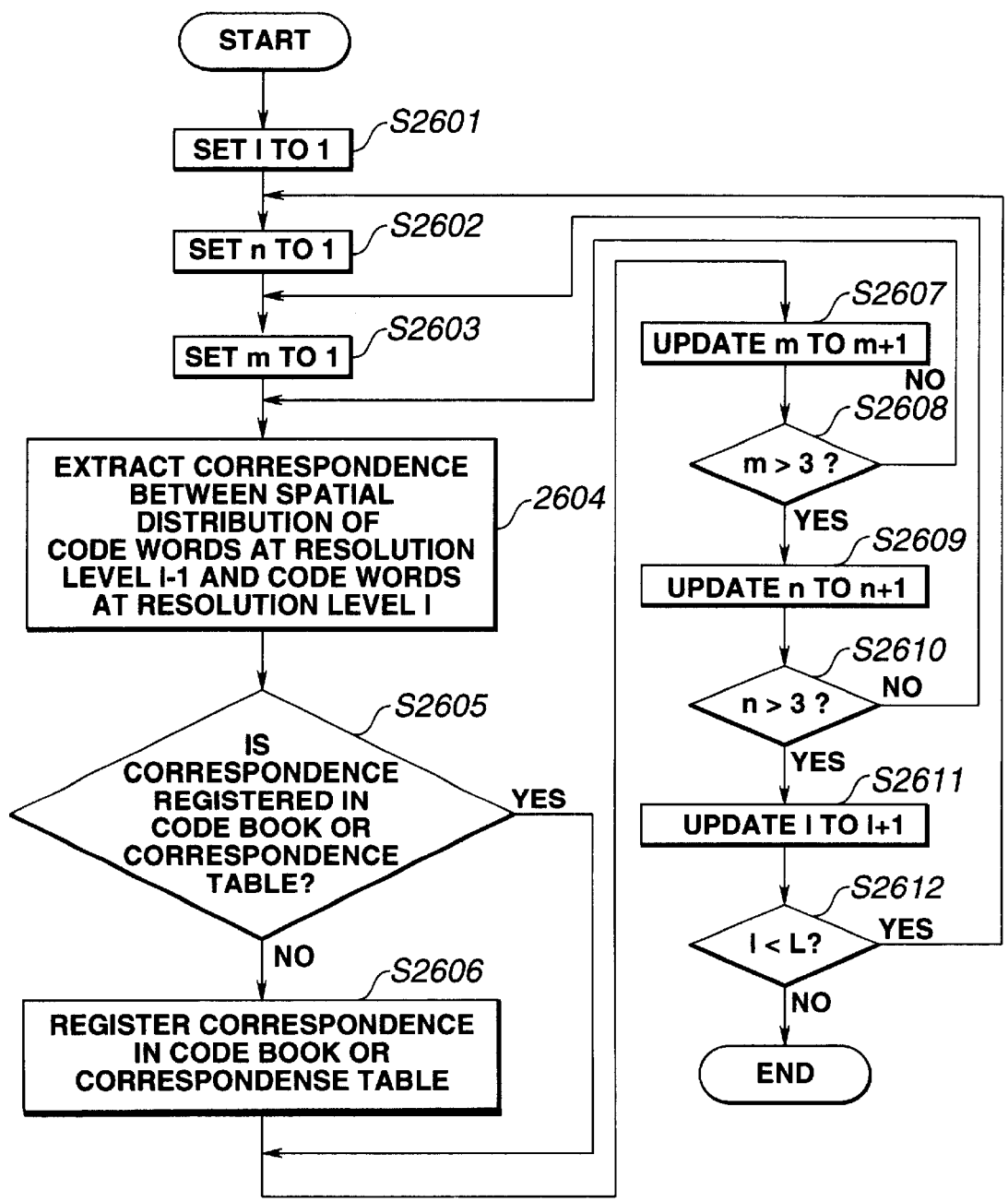
FIG. 26 is a flowchart illustrating coordinating processing.

A description will now be provided of the learning processing executed in step S205 shown in FIG. 2 with reference to FIGS. 24 through 26. As shown in FIG. 24, the learning processing comprises two steps, i.e., encoding processing in step S2401 and coordinating processing in step S2402.

FIG. 25 is a flowchart illustrating the encoding processing.

First, in step S2501, an input image I is converted into multiresolution images. The number of pixels of the input image I in the vertical and horizontal directions is (L+1)-th power of 3. In step S2502, l is set to 0. In step S2503, an image at resolution level l from among the multiresolution images is divided into partial images. In the first embodiment, the image is divided into partial images which are not overlapped at each of 3 pixels in the vertical and horizontal directions. The partial image is hereinafter expressed by a two-dimensional index (m,n) according to the notation of a matrix.

In step S2504, n is set to 1. In step S2505, m is set to 1. In step S2506, it is determined if the partial image (m,n) is registered as a representative vector in the code book for vector quantization. If the result of the determination is affirmative, the process proceeds to step S2508. If the result of the determination is negative, the process proceeds to step S2507.

In step S2507, the partial image is registered in the code book by allocating an appropriate code word thereto. In step S2508, each of the partial images is replaced by a corresponding code word. According to this replacing operation, the number of pixels of each of the partial images is reduced to ⅓ of the initial value both in the vertical and horizontal directions.

In step S2509, m is updated to m+1. In step S2510, it is determined if m exceeds 3. If the result of the determination in step S2510 is affirmative, the process proceeds to step S2711. If the result of the determination in step S2510 is negative, the process proceeds to step S2506.

In step S2511, n is updated to n+1. In step S2512, it is determined if n exceeds 3. If the result of the determination in step S2512 is affirmative, the process proceeds to step S2513. If the result of the determination in step S2512 is negative, the process proceeds to step S2505.

In step S2513, l is updated to l+1. In step S2514, it is determined if l exceeds L. If the result of the determination in step S2514 is affirmative, the process is terminated. If the result of the determination in step S2514 is negative, the process returns to step S2503.

According to the above-described processing, the multiple-resolution image is converted into multiple-resolution code word data in which the number of pixels at each resolution level is reduced to ⅓ of the initial value both in the vertical and horizontal directions. In addition, by registering a representative vector which is not registered in the code book, new data can be dealt with. The code book obtained according to the above-described processing is utilized in the recognition processing of the first embodiment.

FIG. 26 is a flowchart illustrating processing of extracting and registering correspondence between levels using the above-described multiresolution code word data.

The multiresolution code word data will be hereinafter expressed as Y(l,m,n) using three indices, i.e., resolution level l, and two-dimensional discrete coordinates (m,n).

In step S2601, l is set to 1. In step S2602, n is set to 1. In step S2603, m is set to 1.

In step S2604, correspondence between the code word Y(l,m,n) and the following set of code words is extracted:

$$\{Y(l-1, 3m-1, 3n-1),$$
$$(Y(l-1, 3m-1, 3n), Y(l-1, 3m-1, 3n+1)Y(l-1, 3m, 3n-1),$$
$$(Y(l-1, 3m, 3n), Y(l-1, 3m, 3n+1)Y(l-1, 3m+1, 3n-1),$$
$$(Y(l-1, 3m+1, 3n), Y(l-1, 3m+1, 3n+1)\}.$$

In step S2605, it is detemined if the above-described correspondence is registered in the code book or the correspondence table. If the result of the determination is affirmative, the process proceeds to step S2607. If the result of the determination is negative, the process proceeds to step S2606.

In step S2606, the above-described correspondence is registered in the correspondence table.

In step S2607, m is updated to m+1. In step S2608, it is determined if m exceeds 3. If the result of the determination in step S2608 is affirmative, the process proceeds to step S2609. If the result of the determination is in step S2608 negative, the process proceeds to step S2604.

In step S2609, n is updated to n+1. In step S2610, it is determined if n exceeds 3. If the result of the determination in step S2610 is affirmative, the process proceeds to step S2611. If the result of the determination in step S2610 is negative, the process proceeds to step S2603.

In step S2611, l is updated to l+1. In step S2612, it is determined if l exceeds 3. If the result of the determination in step S2612 is affirmative, the process is terminated. If the result of the determination in step S2612 is negative, the process returns to step S2602.

The correspondence table obtained according to the above-described processing is utilized in the above-described recognition processing of the first embodiment.

Second Embodiment

Figure 27:
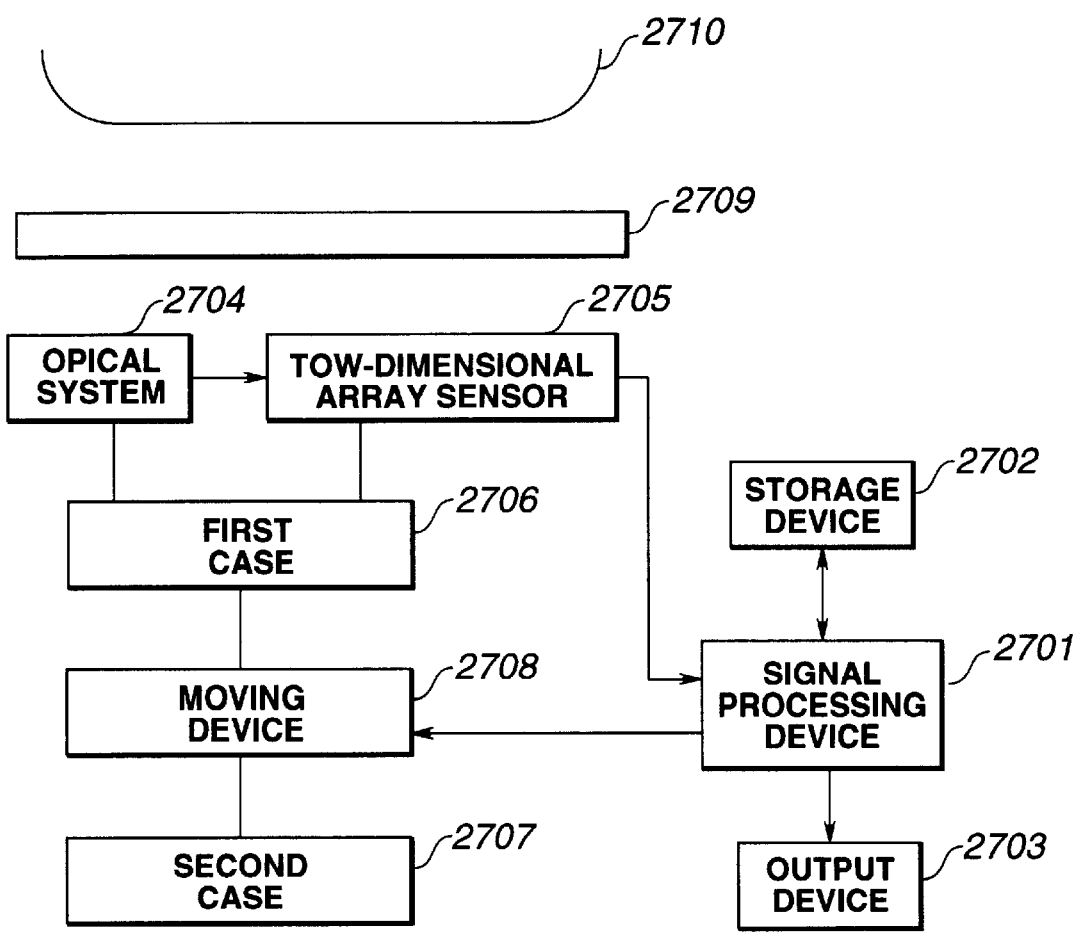
FIG. 27 is a block diagram illustrating the configuration of a second embodiment of the present invention.

FIG. 27 is a diagram illustrating the configuration of a second embodiment of the present invention.

The second embodiment is applied to a monitoring system, an image input system of a robot, or the like. In FIG. 27, there are shown a signal processing device 2701, a storage device 2702, an output device 2703, an optical system 2704, a two-dimensional array sensor 2705, a first case 2706, a second case 2707, and a moving device 2708.

The signal processing device 2701 receives an input signal obtained by sampling an optical signal from the optical system 2704 by the two-dimensional array sensor 2705, processes the input signal using data stored in the storage device 2702, transmits a desired output to the output device 2703, and transmits a signal for controlling input parameters (for example, the azimuth and the position of the optical axis) of the optical system 2704 to the moving device 2708.

In examples of application considered in the second embodiment, the direction of an image to be input is not given in advance. Accordingly, it is required to estimate the direction where information necessary for a task to be executed by the system is present, and to control input parameters so as to arrange the optical axis of the input device to coincide with the direction and to pick up the image with a resolution necessary for acquiring that information.

It is also required for the imaging system to acquire a signal with a high resolution and to observe a wider region. In order to satisfy these contradictory requirements with a limited number of sensors, the spatial resolution of the imaging system is made to be nonuniform. The multiresolution partial image D described in the first embodiment is an example of an input image obtained by such nonuniform sampling.

The second embodiment assumes such an input device.

Optical System 2704

The optical system 2704 deflects light incident from the outside to focus it onto the two-dimensional array sensor 2705 (to be described later). For example, a fisheye lens is used as a lens in which a high resolution and a wide range are compatible with each other. The fisheye lens is classified into four types according to its mapping function.

Two-dimensional Array Sensor 2705

The two-dimensional array sensor 2705 samples an image focused by the optical system 2704 as a two-dimensional digital image. In the two-dimensional digital image, the coordinates of a two-dimensional space are digitized, and the value of a pixel at each sampling point is quantized.

A digital image obtained by adopting a fisheye lens for the optical system 2704 and sampling the obtained image by the two-dimensional array sensor 2705 becomes a pseudo-multiresolution partial image. In the following description, this digital image is written as D as in the first embodiment, where a pixel position is represented by three indices, i.e., resolution level l, and the coordinates (m,n) of a two-dimensional discrete space. For example, the value of a pixel having resolution level l, and positioned at the two-dimensional discrete spatial coordinates (m,n) is written as D(l,m,n).

First Case 2706

The first case 2706 fixes the optical system 2704 and the two-dimensional array sensor 2705.

Second Case 2707

The second case 2707 supports the first case 2706 via the moving device 2708 (to be described below).

Moving Device 2708

The moving device 2708 two-dimensionally moves the first case 2706 relative to the second case 2707. The amount of two-dimensional movement is controlled by a control signal from the signal processing device 2701 (to be described later).

Storage Device 2702

The storage device 2702 stores a signal utilized for the processing of the signal processing device 270. The signal is written and read by the signal processing device 2701.

Output device 2703

The output device 2703 displays or prints an output from the signal processing device 2701.

Original-mount 2709

An original-mount 2709 supports an original 2710 on which an image or a pattern to be recognized by the signal processing device 2701 is depicted. When the image or the pattern depicted on the original is arranged to be input to the optical system 2704 through the original-mount 2709, the original-mount 2709 must be transparent.

Original 2710

An image or a pattern to be recognized by the signal processing device 2701 is depicted on the original 2710.

Signal Processing Device 2701

The signal processing device 2701 is a device for recognizing a digital image transmitted from the two-dimensional array sensor 2705. In order to execute recognition processing, the signal processing device 2701 reads out a signal stored in the storage device 2702, or writes a signal in the storage device 2702, and transmits a control signal for controlling a two-dimensional moving amount to the moving device 2708. The signal processing device 2701 also outputs a result of recognition, or a message when an error is generated to the output device 2703.

The processing of the signal processing device 2701 includes all of the processing described in the first embodiment. The position of the gaze point in the first embodiment corresponds to the optical axis of the optical system 2704 in the second embodiment. The input image I in the first embodiment corresponds to the original 2710 in the second embodiment.

As described above, according to the foregoing embodiments, when performing pattern recognition using a signal obtained by performing nonuniform sampling, the sampling position can be corrected at a high speed in order to more exactly recognize a pattern.

Furthermore, according to the above-described embodiments, even if the direction of a pattern to be recognized is uncertain, the pattern can be caught at a high speed. Hence, a pattern recognition apparatus suitable for being installed in a moving object can be easily obtained.

In addition, according to the above-described embodiments, pattern recognition processing can be achieved with an array sensor having sensors whose number is much smaller than in conventional apparatuses. For example, in the first embodiment, $(3L)^2$ sensors suffice while $3^{2L}$ sensors are necessary in the conventional approach.

The present invention described above may be applied to a system comprising a plurality of computers, or to a specific computer within a system. The present invention may also be applied when the objects of the invention are achieved by executing a program by a computer. The program may be supplied from an external storage device. A storage medium for storing such a program is also within the scope of the invention.

The individual components shown in outline or designated by blocks in the drawings are all well-known in the nonuniformly-sampled-pattern recognition apparatus and method arts and their specific construction and operation are not critical to the operation or the best mode for carrying out the invention.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A pattern recognition apparatus comprising:

input means for inputting a pattern of an image to be recognized;

sampling means for nonuniformly sampling the pattern of the image input from said input means to obtain a multiresolution image near a gaze point;

recognition means for recognizing the pattern of the image based on the multiresolution image obtained by said sampling means;

mutual-information calculation means for calculating mutual information between a first image in the multiresolution image having a first resolution and a second image in the multiresolution image having a second resolution that is different from the first resolution, based on the result of the recognition means; and changing means for changing the gaze point based on the mutual information calculated by said mutual-information calculation means.

2. A pattern recognition apparatus according to claim 1, wherein said sampling means calculates a value of each pixel in an image having each resolution of the multiresolution image using an input image within a range having a size corresponding to each resolution.

3. A pattern recognition apparatus according to claim 2, wherein in said sampling means, the size of the range is larger for higher levels of resolution.

4. A pattern recognition apparatus according to claim 1, wherein said recognition means comprises probability-distribution calculation means for calculating a probability distribution of a state value of each cell in a probabilistic cellular automaton corresponding to the multiresolution image, and identification means for identifying the pattern of the image based on the probability distribution.

5. A pattern recognition apparatus according to claim 4, wherein said probability-distribution calculation means calculates a probability distribution of a state value of a target cell in the probabilistic cellular automaton based on a probability distribution of a state value of a cell near the target cell having a resolution level lower than the resolution level of the target cell.

6. A pattern recognition apparatus according to claim 4, wherein said mutual-information calculation means calculates the mutual information based on a probability distribution of a state value of a cell having a target resolution and a probability distribution of a state value of a cell having a resolution level higher than the cell having the target resolution level.

7. A pattern recognition apparatus according to claim 4, further comprising correspondence storage means for storing correspondence between a state value of a cell, and an image pattern or a pattern of a state value of a subordinate cell, wherein said identification means identifies the pattrern by referring to the correspondence.

8. A pattern recognition apparatus according to claim 7, further comprising learning means for learning the correspondence to be stored in said correspondence storage means.

9. A pattern recognition apparatus according to claim 4, further comprising entropy calculation means for calculating entropy of a probability distribution of a state value of a target cell, wherein said changing means changes the gaze point when the entropy calculated by said entropy calculation means satisfies a predetermined condition.

10. A pattern recognition apparatus according to claim 1, wherein said input means comprises optical input means for optically inputting the pattern of the image, and wherein said changing means comprises moving means for moving an optical axis of said optical input means.

11. A pattern recognition method comprising the steps of:
inputting a pattern of an image to be recognized;
nonuniformly sampling the input pattern of the image to obtain a multiresolution image near a gaze point;
recognizing the pattern of the image based on the multiresolution image obtained by the sampling;
calculating mutual information between a first image in the multiresolution image having a first resolution and a second image in the multiresolution image having a second resolution different from the first resolution, based on the result of the recognizing; and
changing the gaze point based on the mutual information.

12. A pattern recognition method according to claim 11, wherein said sampling step calculates a value of each pixel in an image having each resolution of the multiresolution image using an input image within a range having a size corresponding to each resolution.

13. A pattern recognition method according to claim 12, wherein in said sampling step, the size of the range is larger for higher level of resolution.

14. A pattern recognition method according to claim 11, wherein said recognition step comprises a probability-distribution calculation step of calculating a probability distribution of a state value of each cell in a probabilistic cell automaton corresponding to the multiresolution image, and an identification step of identifying the pattern of the image based on the probability distribution.

15. A pattern recognition method according to claim 14, wherein said probability-distribution calculation step calculates a probability distribution of a state value of a target cell in the probabilistic cellular automaton based on a probability distribution of a state value of a cell near the target cell having a resolution level lower than the resolution level of the target cell.

16. A pattern recognition method according to claim 14, wherein said mutual-information calculation step calculates the mutual information based on a probability distribution of a state value of a cell having a target resolution and a probability distribution of a state value of a cell having a resolution level higher than the cell having the target resolution level.

17. A pattern recognition method according to claim 14, wherein said identification step identifies the pattern by referring to correspondence between a state value of a cell, and an image pattern or a pattern of a state value of a subordinate cell, stored in a correspondence memory.

18. A pattern recognition method according to claim 17, further comprising the step of learning the correspondence to be stored in the correspondence memory.

19. A pattern recognition method according to claim 14, further comprising the step of calculating entropy of a probability distribution of a state value of a target cell, wherein the gaze point is changed in said changing step when the calculated entropy satisfies a predetermined condition.

20. A pattern recognition method according to claim 11, wherein said input step optically inputs the pattern of the image using an optical input unit, and wherein said changing step comprises a moving step of moving an optical axis of the optical input unit.

21. A computer-readable storage medium storing a pattern recognition program for controlling a computer to perform pattern recognition, said program comprising codes for causing the computer to perform the steps of:
inputting a pattern of an image to be recognized;
nonuniformly sampling the input pattern of the image to obtain a multiresolution image near a gaze point;
recognizing the pattern of the image based on the multiresolution image obtained by the sampling;
calculating mutual information between a first image in the multiresolution image having a first resolution and a second image in the multiresolution image having a second resolution different from the first resolution, based on the result of the recognizing; and
changing the gaze point based on the mutual information.

* * * * *

UNITED STATES PATENT AND TRADEMARK OFFICE
CERTIFICATE OF CORRECTION

PATENT NO.    : 6,198,847 B1
DATED         : March 6, 2001
INVENTOR(S)   : Teruyoshi Washizawa It is certified that error appears in the above-identified patent and that said Letters Patent is hereby corrected as shown below:

Drawings,
Sheet 4,
FIG. 4, "APPERRANCE" should read -- APPEARANCE --.

Sheet 27,
FIG. 27, "OPICAL" should read -- OPTICAL --.

Column 2,
Line 62, "probality" should read -- probability --.

Column 3,
Line 58, "A(l,m,n,W))$^2$" should read -- A(l,m,n,W))$^T$ --.

Column 5,
Line 31, "$\phi(\{P_{i,k,k}(\omega=w)$," should read -- $\phi(\{P_{i,j,k}(\omega=w)$, --.

Column 6,
Line 26, "eigth" should read -- eighth --.

Column 8,
Line 15, "$\sum_{N=1}^{\omega=w}$" should read -- $\sum_{\omega=1}^{\omega=w}$ --.

Column 10,
Line 11, "k ≈ kmax," should read -- k ≠ kmax, --.
Line 36, "Pr(D(1.gx," should read -- Pr(D(1,gx, --.

Column 12,
Line 25, "C(1,m,n,)≈0," should read -- C(1,m.n) ≠ 0, --.

Column 15,
Line 47, "is in step S2608" should read -- in step S2608 is --.

Column 18,
Line 32, "wherein" should read -- wherein, --.
Line 59, "pattrern" should read -- pattern --.

UNITED STATES PATENT AND TRADEMARK OFFICE
CERTIFICATE OF CORRECTION

PATENT NO. : 6,198,847 B1
DATED : March 6, 2001
INVENTOR(S) : Teruyoshi Washizawa It is certified that error appears in the above-identified patent and that said Letters Patent is hereby corrected as shown below:

<u>Column 19,</u>
Line 28, "wherein" should read -- wherein, --.
Line 29, "level" should read -- levels --.

Signed and Sealed this

Second Day of April, 2002

*Attest:*

JAMES E. ROGAN
*Attesting Officer*      *Director of the United States Patent and Trademark Office*